United States Patent
Ries et al.

(10) Patent No.: US 11,256,967 B2
(45) Date of Patent: Feb. 22, 2022

(54) CHARACTERIZATION SYSTEM AND METHOD WITH GUIDED DEFECT DISCOVERY

(71) Applicant: KLA Corporation, Milpitas, CA (US)

(72) Inventors: Bradley Ries, San Jose, CA (US);
Tommaso Torelli, San Mateo, CA (US);
Muthukrishnan Sankar, Chennai (IN);
Vineethanand Hariharan, Kerala (IN)

(73) Assignee: KLA Corporation, Milpitas, CA (US)

( * ) Notice: Subject to any disclaimer, the term of this patent is extended or adjusted under 35 U.S.C. 154(b) by 102 days.

(21) Appl. No.: 16/847,367

(22) Filed: Apr. 13, 2020

(65) Prior Publication Data

US 2021/0232872 A1 Jul. 29, 2021

(51) Int. Cl.
*G06K 9/62* (2006.01)
*G06K 9/66* (2006.01)
(Continued)

(52) U.S. Cl.
CPC ........... *G06K 9/66* (2013.01); *G01N 21/8851* (2013.01); *G06T 7/001* (2013.01);
(Continued)

(58) Field of Classification Search
CPC . G06K 9/66; G06T 7/001; G06T 2207/30148; G06T 2207/20081;
(Continued)

(56) References Cited

U.S. PATENT DOCUMENTS

| 6,246,787 B1 * | 6/2001 | Hennessey | G01N 21/95607 250/559.45 |
|---|---|---|---|
| 2009/0063378 A1 * | 3/2009 | Izikson | H01L 22/12 706/21 |

(Continued)

FOREIGN PATENT DOCUMENTS

CN 109242033 A 1/2019

OTHER PUBLICATIONS

Goodfellow, I. et al., Deep Learning, The MIT Press, 2016, Chapter 1.

(Continued)

*Primary Examiner* — Samir A Ahmed
(74) *Attorney, Agent, or Firm* — Suiter Swantz pc llo

(57) ABSTRACT

A system is disclosed, in accordance with one or more embodiment of the present disclosure. The system may include a controller including one or more processors configured to execute a set of program instructions. The set of
(Continued)

program instructions may be configured to cause the processors to: receive images of a sample from a characterization sub-system; identify target clips from patch clips; prepare processed clips based on the target clips; generate encoded images by transforming the processed clips; sort the encoded images into a set of clusters; display sorted images from the set of clusters; receive labels for the displayed sorted images; determine whether the received labels are sufficient to train a deep learning classifier; and upon determining the received labels are sufficient to train the deep learning classifier, train the deep learning classifier via the displayed sorted images and the received labels.

21 Claims, 16 Drawing Sheets

(51) Int. Cl.
*G06T 7/00* (2017.01)
*G01N 21/88* (2006.01)
(52) U.S. Cl.
CPC ........... *G01N 2021/8887* (2013.01); *G06T 2207/10061* (2013.01); *G06T 2207/20081* (2013.01); *G06T 2207/30148* (2013.01)
(58) Field of Classification Search
CPC ...... G06T 2207/10061; G01N 21/8851; G01N 2021/8887; G01N 21/956; G01N 2021/8883
See application file for complete search history.

(56) References Cited

U.S. PATENT DOCUMENTS

| | | | |
|---|---|---|---|
| 2017/0084422 A1 | 3/2017 | Masnaghetti et al. | |
| 2017/0200264 A1* | 7/2017 | Park | G01N 21/9501 |
| 2019/0294923 A1 | 9/2019 | Riley et al. | |
| 2019/0303717 A1* | 10/2019 | Bhaskar | G06K 9/6262 |
| 2019/0362488 A1 | 11/2019 | Fang et al. | |
| 2019/0370955 A1* | 12/2019 | Zhang | G06N 3/0472 |
| 2020/0193927 A1* | 6/2020 | Kurokawa | G11C 27/04 |
| 2020/0226722 A1* | 7/2020 | Pandey | G06T 7/0004 |
| 2020/0273210 A1* | 8/2020 | Nguyen | G06T 9/002 |
| 2021/0010953 A1* | 1/2021 | Adler | H05K 3/4038 |
| 2021/0150387 A1* | 5/2021 | Rothstein | G06N 20/00 |

OTHER PUBLICATIONS

Hinton, G. E. et al., "Reducing the Dimensionality of Data with Neural Networks", Science, vol. 313, No. 5786, pp. 504-507, 2006.
Bourlard, B. H. et al., "Auto-Association by Multilayer Perceptrons and Singular Value Decomposition", Biological Cybernetics, vol. 59, No. 4-5, pp. 291-294, 1988.
Arthur, D. et al., "k-means++: The Advantages of Careful Seeding", ACM-SIAM symposium on discrete algorithms, pp. 1027-1035, 2007.
PCT International Search Report and Written Opinion for International Application No. PCT/US2021/014254 dated May 10, 2021, 8 pages.

* cited by examiner

CHARACTERIZATION SYSTEM AND METHOD WITH GUIDED DEFECT DISCOVERY

CROSS-REFERENCE TO RELATED APPLICATION

The present application claims the benefit of India Provisional Patent Application No. 202041003543, filed Jan. 27, 2020, entitled CHARACTERIZATION SYSTEM AND METHOD WITH GUIDED DEFECT DISCOVERY, naming Bradley Ries, Tommaso Torelli, Muthukrishnan Sankar, and Vineeth Hariharan, as inventors, which is incorporated herein by reference in the entirety.

TECHNICAL FIELD

The present invention generally relates to the fields of sample characterization and, more particularly, to a characterization system and method with guided defect discovery.

BACKGROUND

Demand for electronic logic and memory devices with ever-smaller footprints and features present a wide range of manufacturing challenges beyond fabrication at a desired scale. Increasingly complex structures result in increasing numbers of parameters which must be monitored and controlled to maintain device integrity. One important characteristic in the field of semiconductor fabrication is defect classification. Conventional methods of classifying defects include, but are not limited to, rule-based binning (RBB) and algorithm-based techniques (e.g., machine learning or deep learning).

Algorithm-based defect classification requires a sufficient number of examples in order to effectively classify such defects. This may be an impossible task as datasets often return anywhere between 10,000-1,000,000 events. Conventional techniques require a user to assign labels to all examples, which can be a tedious and exhausting task. Additionally, datasets are often too unbalanced to get any examples for rare bins in a sub-sampling. Further, there are often no known features that offer discerning information between classes.

Therefore, it would be desirable to provide a system and method that cure the shortfalls of the previous approaches identified above.

SUMMARY

A system is disclosed, in accordance with one or more embodiments of the present disclosure. In one embodiment, the system includes a controller including one or more processors configured to execute a set of program instructions stored in memory. The set of program instructions may be configured to cause the one or more processors to carry out various functions and steps of the present disclosure. In another embodiment, the controller is configured to receive one or more images of a sample from a characterization sub-system, wherein the one or more images include one or more patch clips. In another embodiment, the controller is configured to identify one or more target clips from the one or more patch clips. In another embodiment, the controller is configured to prepare one or more processed clips based on the one or more target clips. In another embodiment, the controller is configured to generate one or more encoded images by transforming the one or more processed clips via an autoencoder. In another embodiment, the controller is configured to sort the one or more encoded images into a set of clusters via a clustering algorithm. In another embodiment, the controller is configured to display one or more sorted images from one or more of the set of clusters to a user via a user interface. In another embodiment, the controller is configured to receive one or more labels for the one or more displayed sorted images from the user via the user interface. In another embodiment, the controller is configured to determine whether the received one or more labels are sufficient to train a deep learning classifier. Upon determining the received one or more labels are sufficient to train the deep learning classifier, in another embodiment the controller is configured to train the deep learning classifier via the one or more displayed sorted images and the received one or more labels.

A system is disclosed, in accordance with one or more embodiments of the present disclosure. In one embodiment, the system includes a controller including one or more processors configured to execute a set of program instructions stored in memory. The set of program instructions may be configured to cause the one or more processors to carry out various functions and steps of the present disclosure. In another embodiment, the controller is configured to receive one or more images of a sample from a characterization sub-system wherein the one or more images include one or more patch clips. In another embodiment, the controller is configured to identify one or more target clips from the one or more patch clips. In another embodiment, the controller is configured to prepare one or more processed clips based on the one or more target clips. In another embodiment, the controller is configured to generate one or more encoded images by transforming the one or more processed clips via an autoencoder. In another embodiment, the controller is configured to sort the one or more encoded images into a set of clusters via a clustering algorithm. In another embodiment, the controller is configured to display one or more sorted images from one or more of the set of clusters to a user via a user interface. In another embodiment, the controller is configured to receive one or more labels for the one or more displayed sorted images from the user via the user interface. In another embodiment, the controller is configured to determine whether the received one or more labels are sufficient to train a deep learning classifier. Upon determining the received one or more labels are insufficient to train the deep learning classifier, in another embodiment the controller is configured to display additional one or more sorted images to the user via the user interface. In another embodiment, the controller is configured to receive one or more additional labels for the one or more additional displayed sorted images from the user via the user interface. In another embodiment, the controller is configured to determine whether the received one or more additional labels are sufficient to train the deep learning classifier. Upon determining the received one or more additional labels are sufficient to train the deep learning classifier, in another embodiment the controller is configured to train the deep learning classifier via the one or more displayed sorted images, the one or more additional displayed sorted images, the received one or more labels, and the received one or more additional labels.

A method is disclosed, in accordance with one or more embodiments of the present disclosure. In one embodiment, the method includes receiving one or more images of a sample from a characterization sub-system, wherein the one or more images include one or more patch clips. In another embodiment, the method includes identifying one or more target clips from the one or more patch clips; preparing one or more processed clips based on the one or more target clips. In another embodiment, the method includes generating one or more encoded images by transforming the one or more processed clips via an autoencoder. In another embodiment, the method includes sorting the one or more encoded images into a set of clusters via a clustering algorithm. In another embodiment, the method includes displaying one or more sorted images from one or more of the set of clusters to a user via a user interface. In another embodiment, the method includes receiving one or more labels for the one or more displayed sorted images from the user via the user interface. In another embodiment, the method includes determining whether the received one or more labels are sufficient to train a deep learning classifier. Upon determining the received one or more labels are sufficient to train the deep learning classifier, in another embodiment, the method includes training the deep learning classifier via the one or more displayed sorted images and the received one or more labels.

A method is disclosed, in accordance with one or more embodiments of the present disclosure. In one embodiment, the method includes receiving one or more images of a sample from a characterization sub-system, wherein the one or more images include one or more patch clips. In another embodiment, the method includes identifying one or more target clips from the one or more patch clips; preparing one or more processed clips based on the one or more target clips. In another embodiment, the method includes generating one or more encoded images by transforming the one or more processed clips via an autoencoder. In another embodiment, the method includes sorting the one or more encoded images into a set of clusters via a clustering algorithm. In another embodiment, the method includes displaying one or more sorted images from one or more of the set of clusters to a user via a user interface. In another embodiment, the method includes receiving one or more labels for the one or more displayed sorted images from the user via the user interface. In another embodiment, the method includes determining whether the received one or more labels are sufficient to train a deep learning classifier. Upon determining the received one or more labels are insufficient to train the deep learning classifier, in another embodiment, the method includes displaying one or more additional sorted images to the user via the user interface. In another embodiment, the method includes receiving one or more additional labels for the one or more additional displayed sorted images from the user via the user interface. In another embodiment, the method includes determining whether the received one or more additional labels are sufficient to train the deep learning classifier. Upon determining the received one or more additional labels are sufficient to train the deep learning classifier, in another embodiment, the method includes training the deep learning classifier via the one or more displayed sorted images, the one or more additional displayed sorted images, the received one or more labels, and the received one or more additional labels.

A system is disclosed, in accordance with one or more embodiments of the present disclosure. In one embodiment, the system includes a controller including one or more processors configured to execute a set of program instructions stored in memory. The set of program instructions may be configured to cause the one or more processors to carry out various functions and steps of the present disclosure. In another embodiment, the controller is configured to receive one or more images of a sample from a characterization sub-system, wherein the one or more images include one or more patch clips. In another embodiment, the controller is configured to identify one or more target clips from the one or more patch clips. In another embodiment, the controller is configured to prepare one or more processed clips based on the one or more target clips. In another embodiment, the controller is configured to generate one or more encoded images by transforming the one or more processed clips via an autoencoder. In another embodiment, the controller is configured to sort the one or more encoded images into a set of clusters via a clustering algorithm. In another embodiment, the controller is configured to display one or more sorted images from one or more of the set of clusters to a user via a user interface. In another embodiment, the controller is configured to receive one or more labels for the one or more displayed sorted images from the user via the user interface. In another embodiment, the controller is configured to adjust one or more fabrication tools based on the received one or more labels.

A method is disclosed, in accordance with one or more embodiments of the present disclosure. In one embodiment, the method includes receiving one or more images of a sample from a characterization sub-system, wherein the one or more images include one or more patch clips. In another embodiment, the method includes identifying one or more target clips from the one or more patch clips; preparing one or more processed clips based on the one or more target clips. In another embodiment, the method includes generating one or more encoded images by transforming the one or more processed clips via an autoencoder. In another embodiment, the method includes sorting the one or more encoded images into a set of clusters via a clustering algorithm. In another embodiment, the method includes displaying one or more sorted images from one or more of the set of clusters to a user via a user interface. In another embodiment, the method includes receiving one or more labels for the one or more displayed sorted images from the user via the user interface. In another embodiment, the method includes adjusting one or more fabrication tools based on the received one or more labels.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
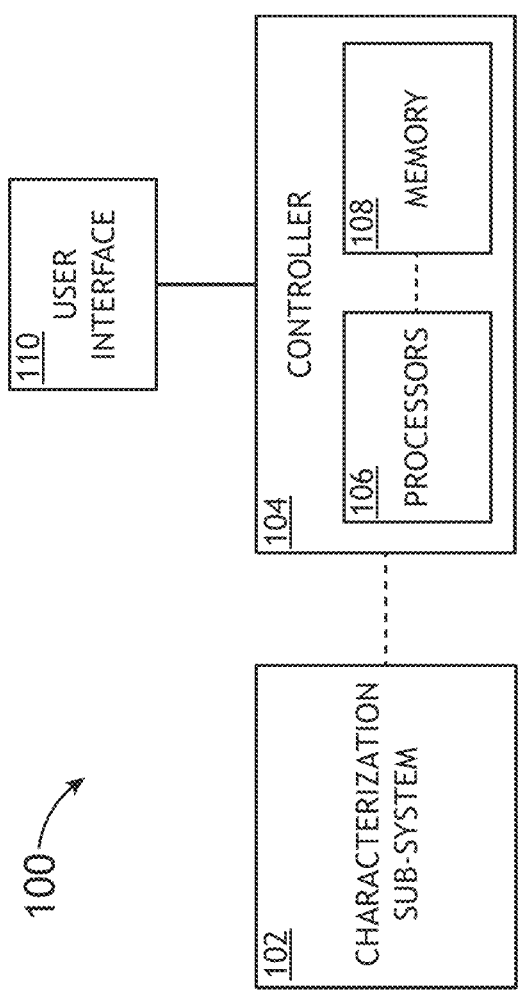
FIG. 1A illustrates a system for characterizing a sample, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

It is noted herein that deep learning-based algorithms perform best when the algorithm is trained with a variety of examples. Finding sufficient examples can be a difficult task. High nuisance vs. low defect count in inspection results is one of the main reasons why such a task is difficult. Nuisance suppression is a challenging task. For example, there is extremely slow throughput time (TPT) when using human operators for review via review optics. By way of another example, there is high grain noise and little distinction between nuisance events and defects of interest (DOIs) using automated inspection for review via inspection optics. Users often struggle through thousands of nuisance events to find valid defects and spend hundreds of hours assigning ground truth. For example, a hot scan of an inspection sub-system may return 10,000-1,000,000 events. Using conventional techniques, the user is required to manually search through the huge list of events and select appropriate defects for deep learning training.

Further, it is noted herein that sometimes it is possible to sort the images based on various physical descriptions (e.g., measurements) and label the extremes of the sorted list(s). Sometimes it is possible to get incomplete human labeling via random sub-sampling that has enough examples per object type to then subsequently find additional similar objects using machine learning. Sometimes it is possible to get ground truth through leveraging outside labelers, such as a label farm, or a customer provided baseline. However, such methods of defect classification are often impracticable or unavailable. Further, such methods may take days to weeks to complete.

Accordingly, embodiments of the present disclosure are directed to curing one or more shortfalls of the previous approaches identified above. Embodiments of the present disclosure are directed to a characterization system and method with guided defect discovery using deep learning processes. More particularly, embodiments of the present disclosure are directed to using deep learning processes to group similar defect types to aid a user in defect discovery. In this regard, the amount of human interaction required to establish a representative labeled dataset is minimized with the use of deep learning processes. A description of deep learning-based processes is found in Goodfellow, et al., Deep Learning, The MIT Press, 2016, which is incorporated by reference in the entirety.

FIG. 1A illustrates a system 100 for characterizing a sample, in accordance with one or more embodiments of the present disclosure. In particular, FIG. 1A illustrates a system 100 for determining the type and size of defects on blank reticles using deep learning processes. The system 100 may include, but is not limited to, one or more characterization sub-systems 102. The system 100 may additionally include, but is not limited to, a controller 104 including one or more processors 106, a memory 108, and a user interface 110.

The characterization sub-system 102 may include any characterization sub-system 102 known in the art including, but not limited to, an optical-based inspection system, a charged particle-based inspection system, and the like. For example, the characterization sub-system 102 may include an optical-based dark-field inspection system. By way of another example, the characterization sub-system 102 may include a scanning electron microscopy (SEM) inspection system. In one embodiment, the controller 104 is communicatively coupled to the one or more characterization sub-systems 102. In this regard, the one or more processors 106 of the controller 104 may be configured to generate one or more control signals configured to adjust one or more characteristics of the characterization sub-system 102.

Figure 1B:
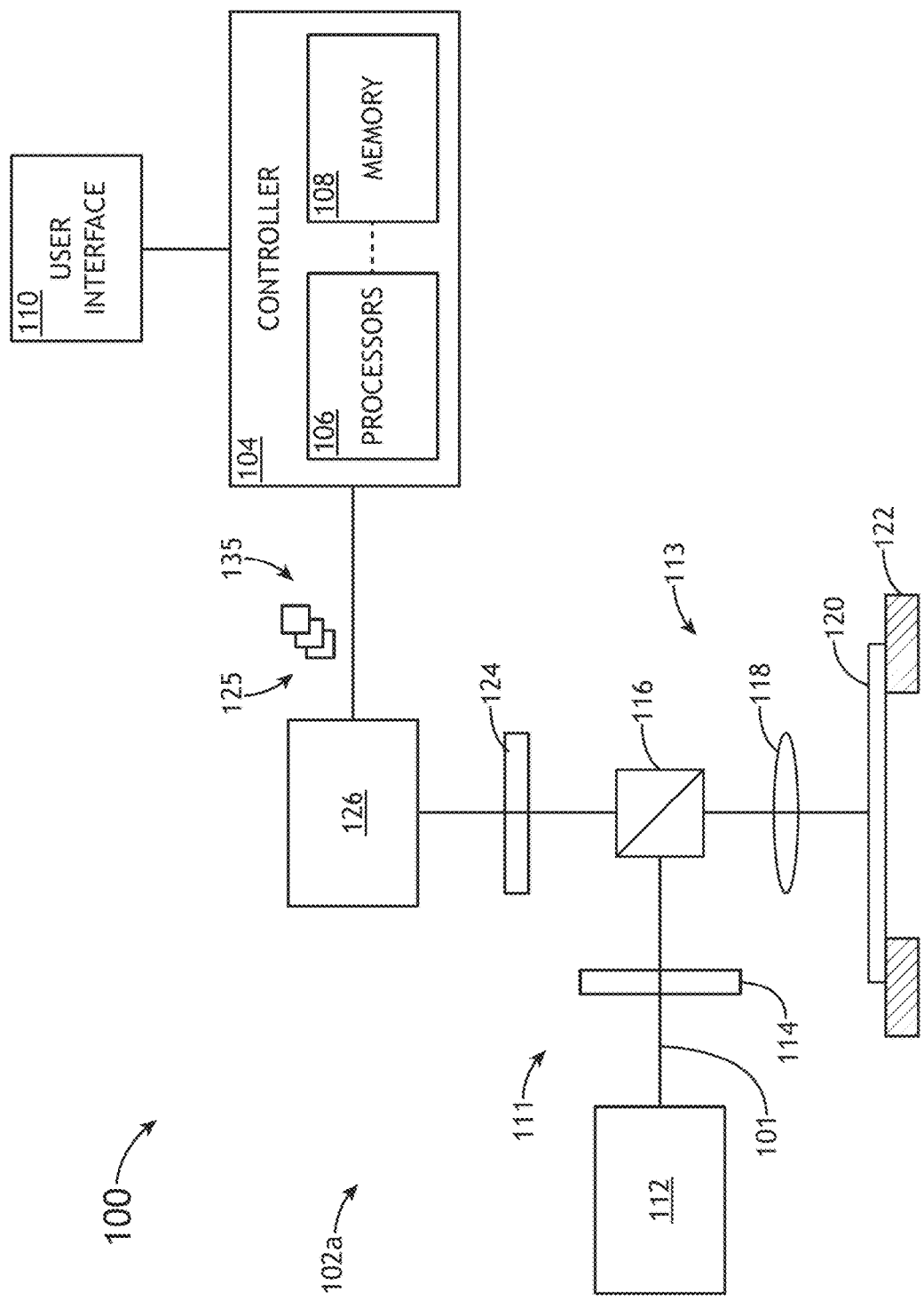
FIG. 1B illustrates a system for characterizing a sample, in accordance with one or more embodiments of the present disclosure.

FIG. 1B illustrates a system 100 for characterizing a sample, in accordance with one or more embodiments of the present disclosure. In particular, FIG. 1B illustrates a system 100 including an optical inspection sub-system 102a.

The optical inspection sub-system 102a may be configured as any optical-based inspection sub-system known in the art including, but not limited to, an image-based metrology tool, a review tool, and the like. For example, the optical inspection sub-system 102a may include an optical dark-field inspection tool. By way of another example, the optical inspection sub-system 102a may include an optical bright-field inspection tool. The optical inspection sub-system 102a may include, but is not limited to, an illumination source 112, an illumination arm 111, a collection arm 113, and a detector assembly 126.

In one embodiment, optical inspection sub-system 102a is configured to inspect and/or measure the sample 120 disposed on the stage assembly 122. Illumination source 112 may include any illumination source known in the art for generating illumination 101 including, but not limited to, a broadband radiation source. In another embodiment, the optical inspection sub-system 102a may include an illumination arm 111 configured to direct illumination 101 to the sample 120. It is noted that illumination source 112 of optical inspection sub-system 102a may be configured in any orientation known in the art including, but not limited to, a dark-field orientation, bright-field orientation, and the like. For example, the one or more optical elements 114, 124 may be selectively adjusted in order to configure the optical inspection sub-system 102a in a dark-field orientation, a bright-field orientation, and the like.

Sample 120 may include any sample known in the art including, but not limited to, a semiconductor wafer, a reticle, a photomask, and the like. In one embodiment, sample 120 is disposed on a stage assembly 122 to facilitate movement of sample 120. In another embodiment, the stage assembly 122 is an actuatable stage. For example, the stage assembly 122 may include, but is not limited to, one or more translational stages suitable for selectively translating the sample 120 along one or more linear directions (e.g., x-direction, y-direction, and/or z-direction). By way of another example, the stage assembly 122 may include, but is not limited to, one or more rotational stages suitable for selectively rotating the sample 120 along a rotational direction. By way of another example, the stage assembly 122 may include, but is not limited to, a rotational stage and a translational stage suitable for selectively translating the sample 120 along a linear direction and/or rotating the sample 120 along a rotational direction. It is noted herein that the system 100 may operate in any scanning mode known in the art.

The illumination arm 111 may include any number and type of optical components known in the art. In one embodiment, the illumination arm 111 includes one or more optical elements 114, a set of one or more optical elements 115, a beam splitter 116, and an objective lens 118. In this regard, illumination arm 111 may be configured to focus illumination 101 from the illumination source 112 onto the surface of the sample 120. The one or more optical elements 114 may include any optical elements known in the art including, but not limited to, one or more mirrors, one or more lenses, one or more polarizers, one or more beam splitters, one or more wave plates, and the like.

In another embodiment, optical inspection sub-system 102a includes a collection arm 113 configured to collect illumination reflected or scattered from sample 120. In another embodiment, collection arm 113 may direct and/or focus the reflected and scattered light to one or more sensors of a detector assembly 126 via one or more optical elements 124. The one or more optical elements 124 may include any optical elements known in the art including, but not limited to, one or more mirrors, one or more lenses, one or more polarizers, one or more beam splitters, one or more wave plates, and the like. It is noted that detector assembly 126 may include any sensor and detector assembly known in the art suitable for detecting illumination reflected or scattered from the sample 120.

In another embodiment, the detector assembly 126 of the optical inspection sub-system 102a is configured to collect metrology data of the sample 120 based on illumination reflected or scattered from the sample 120. In another embodiment, the detector assembly 126 is configured to transmit collected/acquired images and/or metrology data to the controller 104.

As noted previously herein, the controller 104 of system 100 may include one or more processors 106 and memory 108. The memory 108 may include program instructions configured to cause the one or more processors 106 to carry out various steps of the present disclosure. In one embodiment, the program instructions are configured to cause the one or more processors 106 to adjust one or more characteristics of the optical inspection sub-system 102a in order to perform one or more measurements of the sample 120.

In additional and/or alternative embodiments, the characterization sub-system 102 may include a charged particle-based inspection sub-system 102. For example, the characterization sub-system 102 may include an SEM characterization sub-system, as illustrated in FIG. 1C.

Figure 1C:
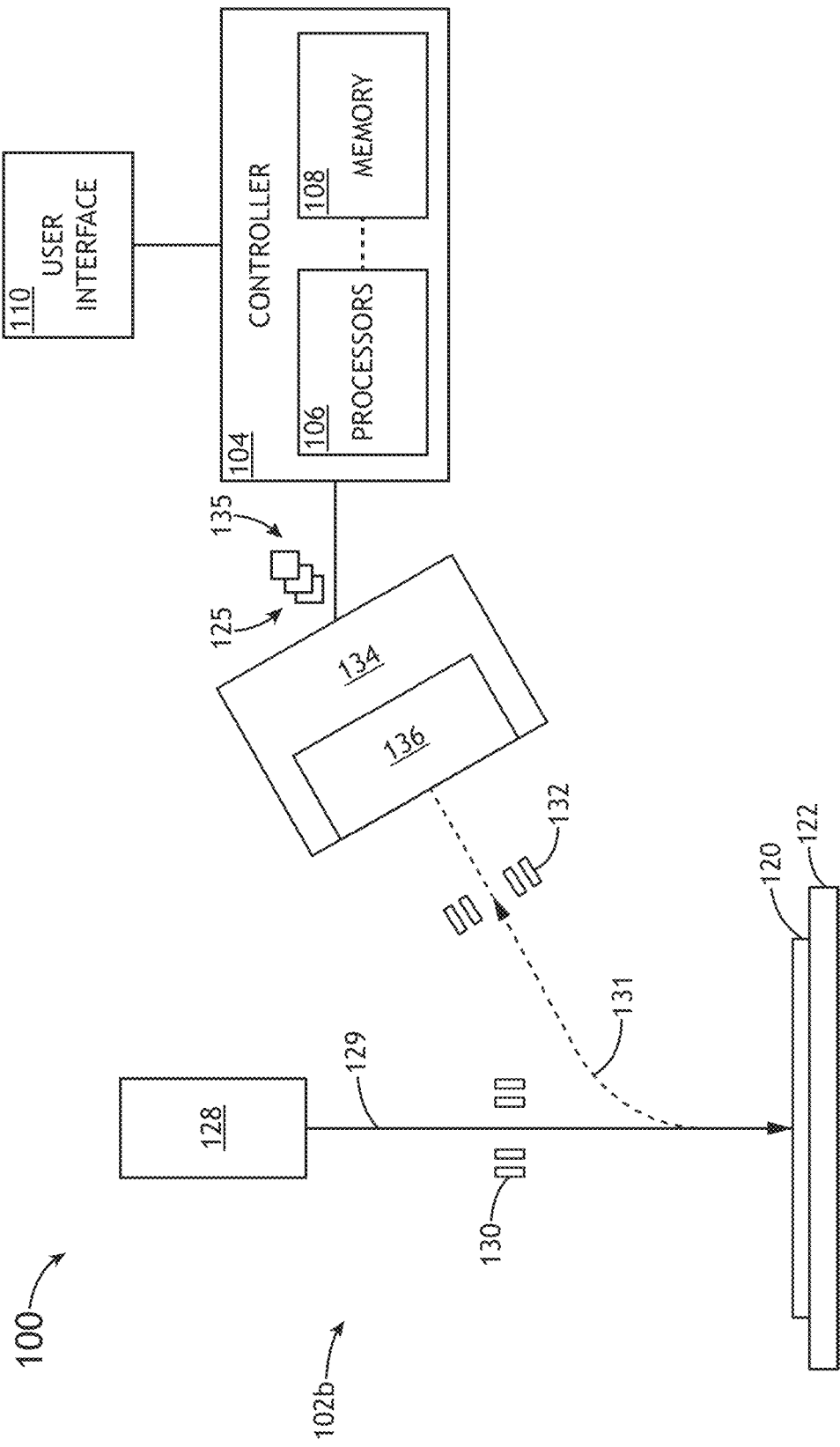
FIG. 1C illustrates a system for characterizing a sample, in accordance with one or more embodiments of the present disclosure.

FIG. 1C illustrates a system 100 for characterizing a sample 120, in accordance with one or more embodiments of the present disclosure. In particular, FIG. 1C illustrates a system 100 including an SEM inspection sub-system 102b.

In one embodiment, the SEM inspection sub-system 102b is configured to perform one or more measurements on the sample 120. In this regard, the SEM inspection sub-system 102b may be configured to acquire one or more images 125 of the sample 120. The one or more images 125 of the sample 120 may include one or more patch clips 135. The SEM inspection sub-system 102b may include, but is not limited to, an electron beam source 128, one or more electron-optical elements 130, one or more electron-optical elements 132, and an electron detector assembly 134 including one or more electron sensors 136.

In one embodiment, the electron beam source 128 is configured to direct one or more electron beams 129 to the sample 120. The electron beam source 128 may form an electron-optical column. In another embodiment, the electron beam source 128 includes one or more additional and/or alternative electron-optical elements 130 configured to focus and/or direct the one or more electron beams 129 to the surface of the sample 120. In another embodiment, SEM inspection sub-system 102b includes one or more electron-optical elements 132 configured to collect secondary and/or backscattered electrons 131 emanated from the surface of the sample 120 in response to the one or more electron beams 129. It is noted herein that the one or more electron-optical elements 130 and the one or more electron-optical elements 132 may include any electron-optical elements configured to direct, focus, and/or collect electrons including, but not limited to, one or more deflectors, one or more electron-optical lenses, one or more condenser lenses (e.g., magnetic condenser lenses), one or more objective lenses (e.g., magnetic condenser lenses), and the like.

It is noted that the electron optical assembly of the SEM inspection sub-system 102b is not limited to the electron-optical elements depicted in FIG. 1C, which are provided merely for illustrative purposes. It is further noted that the system 100 may include any number and type of electron-optical elements necessary to direct/focus the one or more electron beams 129 onto the sample 120 and, in response, collect and image the emanated secondary and/or backscattered electrons 131 onto the electron detector assembly 134.

For example, the system 100 may include one or more electron beam scanning elements (not shown). For instance, the one or more electron beam scanning elements may include, but are not limited to, one or more electromagnetic scanning coils or electrostatic deflectors suitable for controlling a position of the one or more electron beams 129 relative to the surface of the sample 120. Further, the one or more scanning elements may be utilized to scan the one or more electron beams 129 across the sample 120 in a selected pattern.

In another embodiment, secondary and/or backscattered electrons 131 are directed to one or more sensors 136 of the electron detector assembly 134. The electron detector assembly 134 of the SEM inspection sub-system 102b may include any electron detector assembly known in the art suitable for detecting backscattered and/or secondary electrons 131 emanating from the surface of the sample 120. In one embodiment, the electron detector assembly 134 includes an electron detector array. In this regard, the electron detector assembly 134 may include an array of electron-detecting portions. Further, each electron-detecting portion of the detector array of the electron detector assembly 134 may be positioned so as to detect an electron signal from sample 120 associated with one of the incident one or more electron beams 129. The electron detector assembly 134 may include any type of electron detector known in the art. For example, the electron detector assembly 134 may include a micro-channel plate (MCP), a PIN or p-n junction detector array, such as, but not limited to, a diode array or avalanche photo diodes (APDs). By way of another example, the electron detector assembly 134 may include a high-speed scintillator or a photomultiplier tube (PMT) detector.

While FIG. 1C illustrates the SEM inspection sub-system 102b as including an electron detector assembly 134 comprising only a secondary electron detector assembly, this is not to be regarded as a limitation of the present disclosure. In this regard, it is noted that the electron detector assembly 134 may include, but is not limited to, a secondary electron detector, a backscattered electron detector, and/or a primary electron detector (e.g., an in-column electron detector). In another embodiment, SEM inspection sub-system 102b may include a plurality of electron detector assemblies 134. For example, system 100 may include a secondary electron detector assembly 134, a backscattered electron detector assembly 134, and an in-column electron detector assembly 134.

In one embodiment, the one or more processors 106 of the controller 104 are configured to analyze the output of detector assembly 126/electron detector assembly 134. In one embodiment, the set of program instructions are configured to cause the one or more processors 106 to analyze one or more characteristics of the sample 120 based on images received from the detector assembly 126/electron detector assembly 134. In another embodiment, the set of program instructions are configured to cause the one or more processors 106 to modify one or more characteristics of system 100 in order to maintain focus on the sample 120 and/or the detector assembly 126/electron detector assembly 134. For example, the one or more processors 106 may be configured to adjust one or more characteristics of the illumination source 112/electron beam source 128 and/or other elements of system 100 in order to focus the illumination 101 and/or one or more electron beams 129 onto the surface of the sample 120. By way of another example, the one or more processors 106 may be configured to adjust the one or more elements of system 100 in order to collect illumination and/or secondary electrons 131 from the surface of the sample 120 and focus the collected illumination on the detector assembly 126/electron detector assembly 134. By way of another example, the one or more processors 106 may be configured to adjust one or more focusing voltages applied to one or more electrostatic deflectors of electron beam source 128 in order to independently adjust the position or alignment of the one or more electron beams 129 and scan the electron beams 129 across the sample 120.

In another embodiment, as shown in FIGS. 1A-1C, system 100 includes a user interface 110 communicatively coupled to the controller 104. In another embodiment, the user interface 110 includes a user input device and a display. The user input device of the user interface 110 may be configured to receive one or more input commands from a user, the one or more input commands configured to input data into system 100 and/or adjust one or more characteristics of system 100. For example, as will be described in further detail herein, the user input device of the user interface 110 may be configured to receive one or more labels for one or more displayed sorted images from a user. By way of another example, the user input device of the user interface 110 may be configured to receive one or more additional labels for one or more displayed sorted images from a user. In another embodiment, the display of the user interface 110 may be configured to display data of system 100 to a user. For example, the display of the user interface 110 may be configured to display diagnostics based on the received one or more labels for the one or more displayed sorted images from the user. By way of another example, the display of the user interface 110 may be configured to display diagnostics based on the received one or more additional labels for the one or more displayed sorted images from the user.

In one embodiment, the one or more processors 106 may be communicatively coupled to memory 108, wherein the one or more processors 106 are configured to execute a set of program instructions stored on memory 108, the set of program instructions configured to cause the one or more processors 106 to carry out various functions and steps of the present disclosure.

In one embodiment, the controller 104 is configured to receive one or more images of a sample from a characterization sub-system 102. In another embodiment, the controller 104 is configured to identify one or more target clips from the one or more patch clips. In another embodiment, the controller 104 is configured to prepare one or more processed clips based on the one or more target clips. In another embodiment, the controller 104 is configured to generate one or more encoded images by transforming the one or more processed clips via an autoencoder. In another embodiment, the controller 104 is configured to sort the one or more encoded images into a set of clusters via a clustering algorithm. In another embodiment, the controller 104 is configured to display one or more additional sorted images from one or more of the set of clusters to a user via a user interface. In another embodiment, the controller 104 is configured to receive one or more labels for the one or more displayed sorted images from the user via the user interface. In another embodiment, the controller 104 is configured to determine whether the received one or more labels are sufficient to train a deep learning classifier. In another embodiment, upon determining the received one or more labels are sufficient to train the deep learning classifier, the controller 104 is configured to train the deep learning classifier via the one or more displayed sorted images and the received one or more labels. Each of these steps/functions of the controller 104 will each be described in further detail herein.

In one embodiment, the controller 104 is configured to receive one or more images of a sample from a characterization sub-system 102. In another embodiment, the controller 104 is configured to identify one or more target clips from the one or more patch clips. In another embodiment, the controller 104 is configured to prepare one or more processed clips based on the one or more target clips. In another embodiment, the controller 104 is configured to generate one or more encoded images by transforming the one or more processed clips via an autoencoder. In another embodiment, the controller 104 is configured to sort the one or more encoded images into a set of clusters via a clustering algorithm. In another embodiment, the controller 104 is configured to display one or more sorted images from one or more of the set of clusters to a user via a user interface. In another embodiment, the controller 104 is configured to receive one or more labels for the one or more displayed sorted images from the user via the user interface. In another embodiment, the controller 104 is configured to determine whether the received one or more labels are sufficient to train a deep learning classifier. In another embodiment, upon determining the received one or more labels are insufficient to train the deep learning classifier, the controller 104 is configured to display one or more additional sorted images to the user via the user interface. In another embodiment, the controller 104 is configured to receive one or more additional labels for the one or more additional displayed sorted images from the user via the user interface. In another embodiment, the controller 104 is configured to determine whether the received one or more additional labels are sufficient to train the deep learning classifier. In another embodiment, upon determining the received one or more additional labels are sufficient to train the deep learning classifier, the controller 104 is configured to train the deep learning classifier via the one or more displayed sorted images, the one or more additional displayed sorted images, the received one or more labels, and the received one or more additional labels. Each of these steps/functions of the controller 104 will each be described in further detail herein.

Figure 2A:
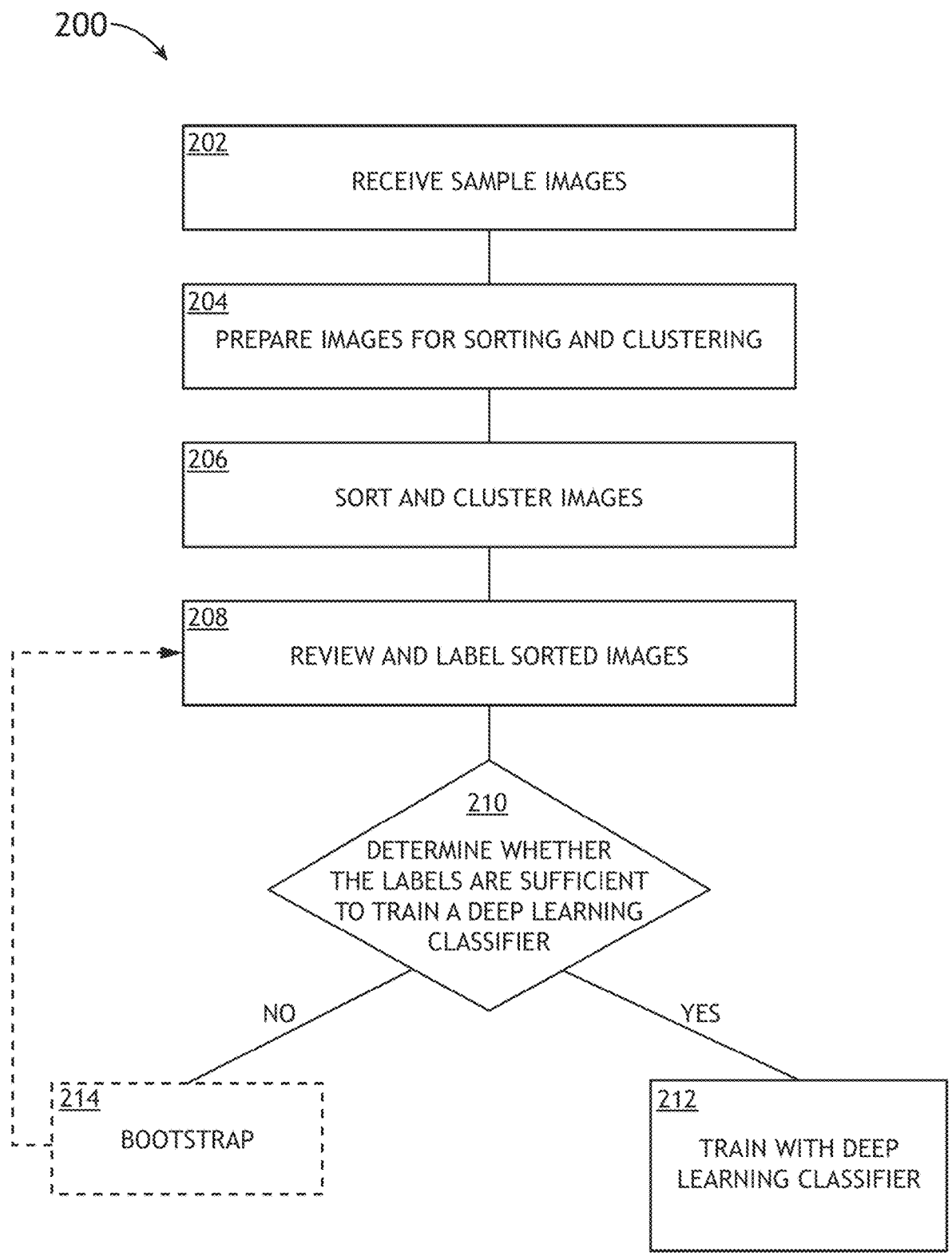
FIG. 2A illustrates a flow chart for characterizing a sample, in accordance with one or more embodiments of the present disclosure.

FIG. 2A illustrates a flowchart 200 for characterizing a sample 120, in accordance with one or more embodiments of the present disclosure. In particular, FIG. 2A illustrates a flowchart 200 for guided defect discovery using deep learning techniques. In this regard, flowchart 200 may be considered as a conceptual flowchart illustrating steps performed by/within the one or more processors 106 of the controller 104.

In one embodiment, in step 202, the system 100 is configured to receive one or more images 125 of a sample 120 from a characterization sub-system 102. In another embodiment, the one or more images 125 include one or more patch clips 135. For example, as shown in FIG. 1B, the controller 104 may be configured to receive one or more optical images 125 of one or more defects of the sample 120 from the optical inspection sub-system 102a. By way of another example, as shown in FIG. 1C, the controller 104 may be configured to receive one or more SEM images 125 of the one or more defects of the sample 120 from the SEM inspection sub-system 102b. In this regard, the one or more images 125 may include any image known in the art including, but not limited to, an optical image 125, an SEM image 125, and the like. In additional and/or alternative embodiments, the controller 104 may be configured to receive one or more images 125 from a source other than the one or more characterization sub-systems 102. For example, the controller 104 may be configured to receive one or more images 125 of features of a sample 120 from an external storage device and/or memory 108. In another embodiment, controller 104 may be further configured to store received one or more images 125 in memory 108. For purposes of the present disclosure, the term "target clips" may be regarded as patch clips including one or more defects of interest (DOIs). Further, for purposes of the present disclosure, the term "patch clips" may be regarded as a portion of the image 125 of the sample 120 received from the characterization sub-system 102.

Figure 2B:
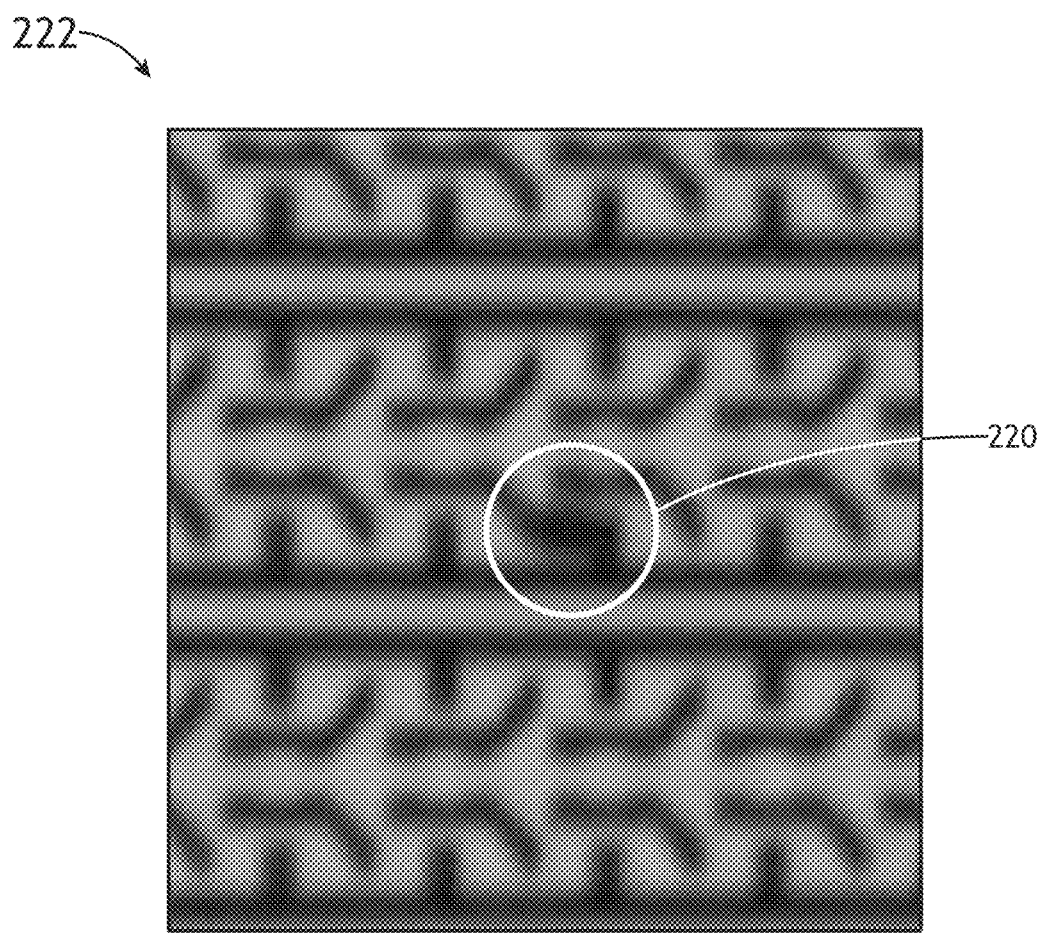
FIG. 2B illustrates an image including a defect, in accordance with one or more embodiments of the present disclosure.

In another embodiment, in step 204, the system 100 is configured to prepare the one or more patch clips 135 for clustering. For example, one or more target clips may be identified from the one or more patch clips 135. For instance, the one or more target clips may include one or more defects of interest (DOIs) such that the one or more target clips may be identified. The one or more target clips may include any type of sample defect known in the art including, but not limited to, random defects, systematic defects, and the like. For example, the sample defects may include a bridging (e.g., redistribution layer (RDL) line bridging, bottom seed bridging, or the like), line open, particles, corrosion, or the like. For instance, as shown in FIG. 2B, a defect 220 is shown at the center of an image 222. The pattern of the image 222 allows the defect 220 to be identified based on the change in pattern shown at the center of the image 222.

It is noted herein that the system 100 may be configured to receive any size patch clip. For example, the system 100 may be configured to receive patch clips with a size of 64×64 (e.g., 4096 pixels). By way of another example, the system may be configured to receive patch clips with a size of 256×256 (e.g., 65,536 pixels). Further, it is noted herein that the system 100 may be configured to receive any number of patch clips with any number of pixels. For example, the system 100 may be configured to receive six patch clips for every defect.

By way of another example, one or more processed clips may be prepared based on the one or more target clips. For instance, at least one of one or more median clips or one or more difference clips may be generated based on the one or more target clips. By way of a further example, one or more processed clips may include one or more noise clips (e.g., standard deviation clips), one or more rendered design clips (e.g., segmentation clips), or the like. It is noted herein that the use of design clips may provide more control to the user to bias the encoder (or the cluster sampling) towards events that fall on critical patterns of interest.

In an example embodiment utilizing dark-field and bright-field inspection sub-systems 102a, one or more processed clips may be prepared based on a dark-field target clip and a bright-field target clip. For example, the one or more median clips may be generated from one target clip and two reference clips. By way of another example, the one or more difference clips may be generated by subtracting the median from the target clip. For instance, a first difference clip (e.g., a dark-field difference (DF_D) clip) may be generated by subtracting the dark-field median clip from the dark-field target (DF_T) clip. Further, a second difference clip (e.g., a bright-field difference (BF_D) clip) may be generated by subtracting the bright-field median clip from the bright-field target (BF_T) clip. In this regard, for a given defect, the system 100 may include four processed clips (e.g., BF_T, BF_D, DF_T, and DF_D). It is noted herein the target (T) and difference (D) clips may be mean-centered and normalized. By way of a further example, a noise clip (or standard deviation) may be generated. For instance, a scatter-gram plot may be created using one or more intensity values of the median clip as the x-axis and one or more difference image values as the y-axis. In this regard, the standard deviation may be calculated as a lookup table function of median intensity per channel. Further, a polygon rendering of the design file exists that may be used to create a binary image clip that is aligned with the median image.

Further, one or more encoded images may be generated by transforming the one or more processed clips via an autoencoder. For purposes of the present disclosure, the term "autoencoder" refers to a neural network whose objective is to compress the input data ($x_i$) into a desired size (e.g., hidden layer ($h_i$) or latent space) and further reconstruct the input data ($\hat{x}_i$) with a minimum reconstruction loss. Thus, the autoencoder may be configured to help identify and retain the essential information of the input data in the hidden layer (h). A general autoencoder may be described by Eqn. 1:

$$h_i = g(Wx_i + b)$$

$$\hat{x}_i = f(W^T h_i + c)$$

where $x_i, \hat{x}_i R^n$
$h_i \in R^m$
m<<n

Eqn. 1 describes the construction of hidden and output layer units for a single input data, where W is the compressed part of the autoencoder (e.g., encoder) and $W^T$ is the decompressed part of the autoencoder (e.g., decoder). In Eqn. 1, $x_i$ is the image i, $h_i$ is the encoded image i, W is the weight matrix of the encoder, b is the bias vector of the encoder, $\hat{x}_i$ is the reconstructed image, $W^T$ is the weight matrix of the decoder, c is the bias of the decoder, $R^n$ is all possible images of size n pixels, and $R^m$ is all possible encoded images of length m. The activation functions are given by g( ) and f( ), where g( ) is the activation function of the encoder and f( ) is the activation function of the decoder. A description of autoencoders is found in G. E. Hinton et al., *Reducing the dimensionality of data with neural networks*, vol. 313, no. 5786, pp. 504-507, 2006, which is incorporated by reference in the entirety. A description of autoencoders is found in B. H. et al., *Auto-Association by Multilayer Perceptrons and Singular Value Decomposition*, Biological Cybernetics, vol. 59, no. 4-5, pp. 291-294, 1988, which is incorporated by reference in the entirety.

The loss function that drives the autoencoder (e.g., Eqn. 1) for binary inputs is binary cross-entropy (not shown). The loss function (L) for real value inputs is squared error loss and may be described by Eqn. 2:

$$L = \|x_i - \hat{x}_i\|_2^2$$

Typically, autoencoder training begins with randomly initialized weights and at every iteration, the loss function (Eqn. 2) drives the weights to reach an optimal solution. However, when the autoencoder has linear activation functions in encoder and decoder squared error loss function and normalized inputs the optimal weights are given by the eigenvectors of the covariance matrix of the input data, which may be described by Eqn. 3:

$$W = U_{\leq m}$$

$$XX^T = UDU^T$$

where $X \in R^{n \times N}$

In Eqn. 3, matrix 'X' is constructed from "N" mean-centered and normalized input data points, where W is the first m columns of weights of the single-value decomposition U of input data, XTX is the covariance matrix of the input dataset, and D is the diagonal matrix of eigen values of XTX.

In an example embodiment, the autoencoder is a stacked, three-layer autoencoder including a convolutional layer and two fully connected layers. For example, the stacked autoencoder may learn an effective low dimensional representation of the input data, which is described further herein. For instance, the input image may include 1024 pixels (e.g., 32×32) and be reduced to less than 100 values. In another instance, the input image may include 4096 pixels (e.g., 64×64) and be reduced to less than 400 values. It is noted herein that the input image may have any number of pixels and the autoencoder may be configured to reduce the data to less than any number of values. Therefore, the above description shall not limit the scope of the present disclosure.

It is noted herein that the autoencoder algorithm may be configured to run on at least one of a computer processing unit (CPU), graphic processing unit (GPU), solid works (SW), or the like. Further, it is noted herein that the autoencoder algorithm may include a linear or non-linear activation function.

In an additional/alternative embodiment, the system 100 utilizes a principal component analysis (PCA) to encode the one or more encoded images. For example, the PCA may compress the input data into the one or more encoded images.

In another embodiment, in step 206, the system 100 is configured to sort the one or more encoded images into a set of clusters via a clustering algorithm. For example, once the autoencoder has learned the mapping of the input data (as shown in step 204) the data is mapped and clustered using the clustering algorithm. For instance, similar objects may be grouped together into a manageable number of categories using the clustering algorithm. In this regard, groups of objects are clustered together based on similar values in the one or more encoded images. The controller 104 may be configured to sort the one or more encoded images into a set of clusters using any clustering algorithm including, but not limited to, supervised learning, unsupervised learning, and the like. A description of clustering algorithms is found in D. Arthur et al., *K-Means++: The Advantages of Careful Seeding*, ACM-SIAM Symposium on Discrete Algorithms, pp. 1027-1035, 2007, which is incorporated by reference in the entirety.

In an example embodiment, the clustering algorithm is a k-means++ clustering algorithm (e.g., an unsupervised learning algorithm). For example, the algorithm includes a first step where an initial center $c_1$ uniformly at random is chosen from X. By way of another example, the algorithm includes a second step where the next center $c_i$ is chosen by selecting $c_i = x' \in X$ with probability $$\frac{D(x')^2}{\sum_{x \in X} D(x)^2}.$$

Further, the second step is repeated until a total of K centers (e.g., the number of required clusters) have been chosen. The k-means++ clustering algorithm will be described further herein.

In an additional/alternative embodiment, in step 206, the system 100 is configured to sort and review the images utilizing diversity sampling. For example, the diversity sampling may be configured to select examples of a population to infer properties of the entire set. For instance, the diversity sampling may be configured to select examples that are as far apart from each other as possible. In another instance, the diversity sampling may be configured to utilize inputs from a user having prior knowledge of where defects are more or less likely to occur. Further, each sample image may contain an associated list of metrics describing attributes associated with the detection of such event. In this regard, a user may assign rules based on these attributes to perform diversity sampling. It is noted herein that the one or more attributes associated with the detection may include, but not limited to, defective area, peak difference intensity, and region of interest.

In another embodiment, in step 208, the system 100 is configured to review and label the sorted images. For example, the system 100 may be configured to display one or more sorted images from one or more of the set of clusters to a user via a user interface 110, as discussed further herein in FIG. 6. For instance, the output of the clustering algorithm may determine where a characterization sub-system (e.g., inspection tool, review tool, or the like) grabs images to display to the user such that the user may label the images. In this regard, the user interface 110 may be configured to display highlighted examples per cluster for the user to assign labels. For example, the user interface 110 may display highlighted examples based on size (e.g., descending or ascending order).

By way of another example, the system 100 may be configured to receive one or more labels for the one or more displayed sorted images from the user via the user interface 110. For instance, the user may label the one or more displayed sorted images via a user input device of the user interface 110. It is noted herein that the one or more labels may include any label suitable for defining one or more defects on the sorted image including, but not limited to, large particle, small particle, cluster, pattern, discoloration, false non-visible defect (NVD), copper bridge (Cu bridge), flake, scratch, stacking fault, slurry bead, or the like.

In another embodiment, in step 210, the system 100 is configured to determine whether the received one or more labels are sufficient to train a deep learning classifier. For example, a user may determine that the system 100 has received a sufficient number of labels for a variety of classes of defects, such that the deep learning classifier may be trained. As previously noted herein, the deep learning classifier requires a sufficient number of varied examples in order to effectively train the deep learning classifier to automatically classify one or more additional target images.

In another embodiment, in step 212, upon determining the one or more received labels are sufficient to train the deep learning classifier, the deep learning classifier is trained. For example, once the deep learning classifier is trained, such classifier may be applied to one or more additional target images. It is noted herein the deep learning classifier allows a user to quickly review defects and choose suitable examples to train the classification system. In particular, the deep learning classifier is used to group similar defect types into the same bin to quickly guide the user through defect discovery.

In another embodiment, in step 214, upon determining the one or more received labels are insufficient to train the network with the deep learning classifier, a bootstrap step is performed. For example, the system 100 may be configured to recommend one or more additional sorted images to attain one or more additional labels. For instance, the system 100 may further display one or more sorted images to the user via the user interface, such that the one or more sorted images may receive one or more additional labels in step 208. In this regard, once the user has received the one or more additional labels the user may determine whether such additional labels are sufficient to train the deep learning classifier. More particularly, the system 100 may be configured to recommend the one or more additional sorted images by presenting to the user events with mixed probability scores. For purposes of the present disclosure, the term "additional sorted images" refers to images that have been previously sorted by the system 100 but not yet labeled by a user. It is noted herein that the one or more additional labels may include any label suitable for defining one or more defects on the sorted image including, but not limited to, large particle, small particle, cluster, pattern, discoloration, false non-visible defect (NVD), copper bridge (Cu bridge), flake, scratch, stacking fault, slurry bead, or the like.

By way of another example, the system 100 may be configured to train a weakly supervised deep learning classifier with the one or more labels. By way of a further example, the system 100 may be configured to recommend images without labels that are similar to bins with few events or for which the network has low confidence in.

By way of a further example, the system 100 may be configured to present to the user events that have been mislabeled by the user. For instance, the mislabeled events may be presented to the user based on low probability scores associated with the user-specified label. In this regard, the system 100 allows a user to fix labeling errors that may impact the deep-learning network performance. It is noted herein that the deep learning classifier may be trained using the low-resolution images or the high-resolution images in parallel or in place of the low-resolution or high-resolution images.

In an example embodiment, a user may prompt the system 100 to display one or more additional sorted images of category A defects (e.g., images in a category A bin). For example, the user may prompt the system 100 to display 30 category A defects. In this regard, the system 100 may be configured to recommend additional sorted category A defect images for the user to label. It is noted herein that the user may prompt the system 100 to find any number of images and category of defect images for any categorical bin.

Figure 3A:
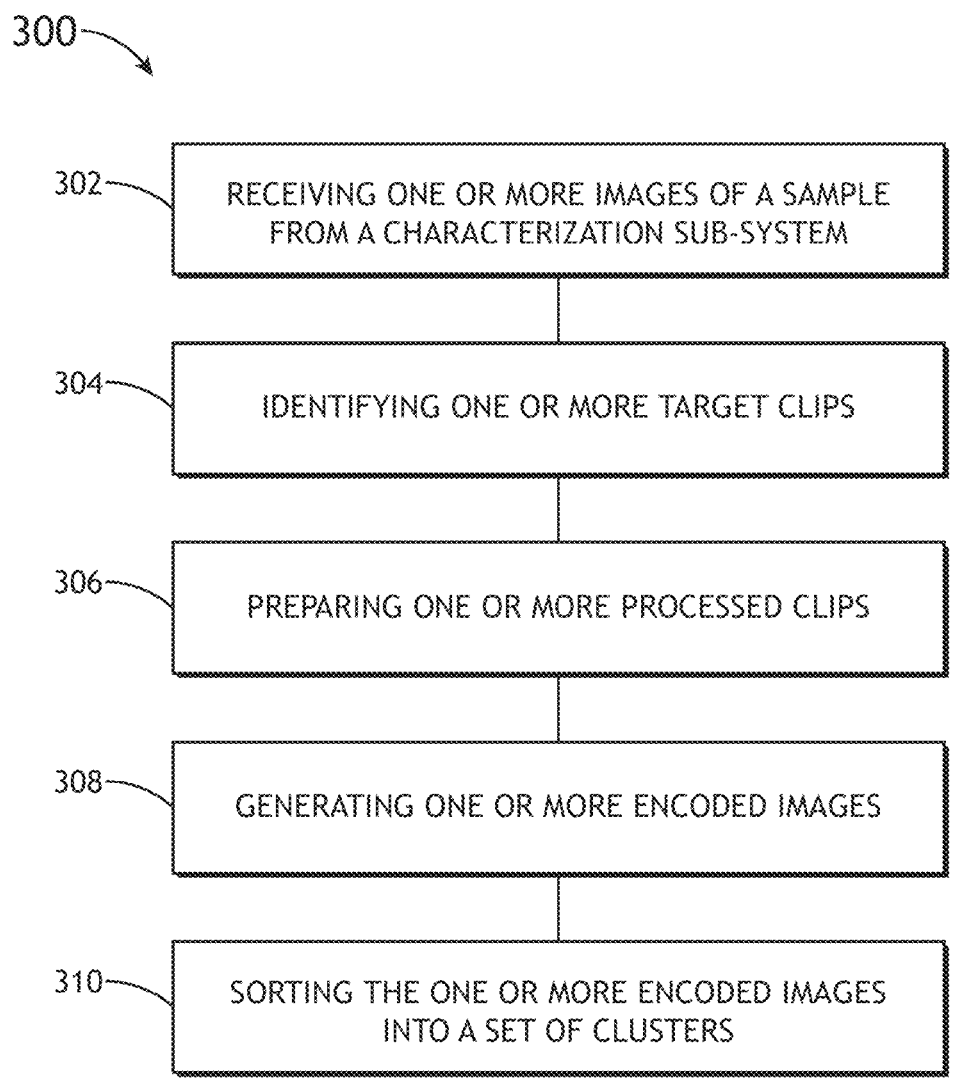
FIG. 3A illustrates a flowchart of a portion of a method for characterizing a sample, in accordance with one or more embodiments of the present disclosure.
Figure 3B:
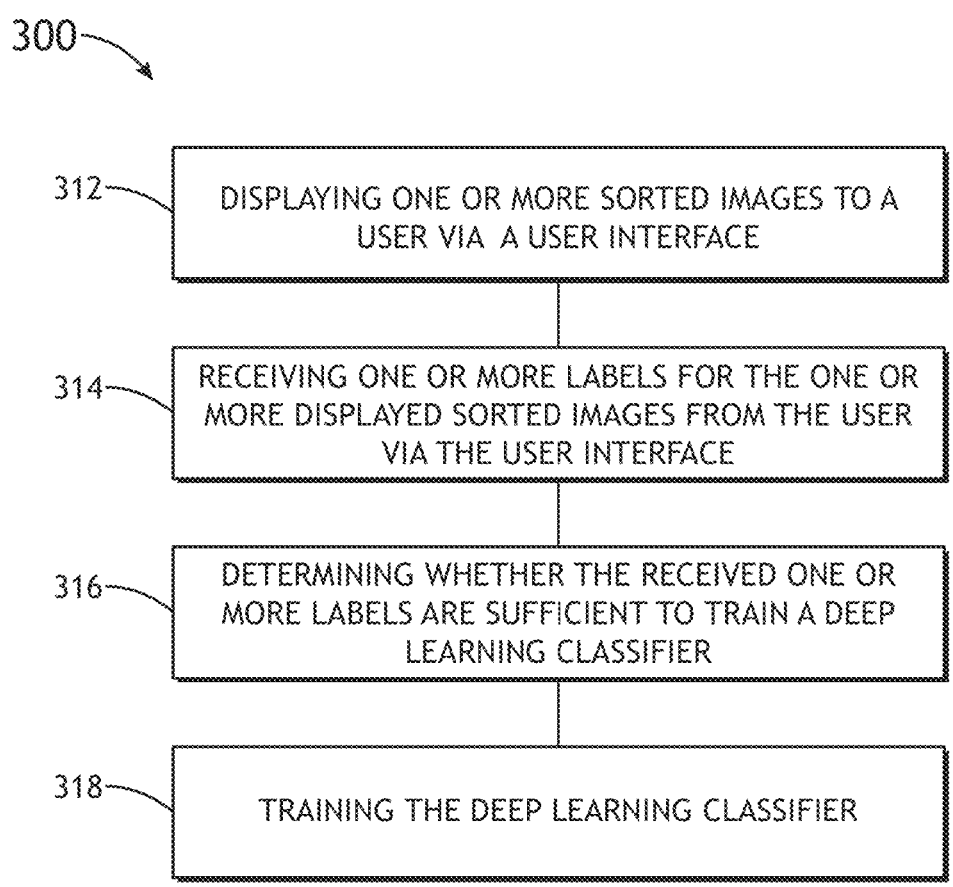
FIG. 3B illustrates a flowchart of a portion of a method for characterizing a sample, in accordance with one or more embodiments of the present disclosure.

FIGS. 3A-3B illustrate a flowchart of a method 300 for using guided discovery to detect defects, in accordance with one or more embodiments of the present disclosure. In particular, FIGS. 3A-3B illustrate a method 300 for detecting defects using deep learning techniques. It is noted herein that the steps of method 300 may be implemented all or in part by system 100. It is further recognized, however, that the method 300 is not limited to the system 100 in that additional or alternative system-level embodiments may carry out all or part of the steps of method 300.

In a step 302, one or more images 125 of a sample 120 are received from a characterization sub-system 102. For example, as shown in FIG. 1B, the controller 104 may be configured to receive one or more optical images 125 of one or more defects of the sample 120 from the optical inspection sub-system 102*a*. By way of another example, as shown in FIG. 1C, the controller 104 may be configured to receive one or more SEM images 125 of the one or more defects of the sample 120 from the SEM inspection sub-system 102*b*.

In a step 304, one or more target clips are identified from one or more patch clips 135. The one or more images of the sample 120 may include the one or more patch clips 135 for every defect.

In a step 306, one or more processed clips are prepared based on the one or more target clips. For example, one or more median clips may be generated based on the one or more target clips and one or more reference clips. For instance, the one or more median clips may be generated based on a first target clip, a first reference clip, and a second reference clip. By way of another example, one or more difference clips may be generated based on the one or more target clips and the one or more median clips. For instance, the one or more difference clips may be generated by subtracting the median clip from the target clip. For purposes of the present disclosure, the term "reference clips" refers to clips which are substantially clean (e.g., contain no defects).

In a step 308, one or more encoded images are generated by transforming the one or more processed clips via an autoencoder. For example, the autoencoder may be configured to learn an effective low dimensional representation of the input data (e.g., the one or more patch clips) using a stacked autoencoder (e.g., a single three layered autoencoder). For instance, the autoencoder may receive the one or more processed clips from step 306 as an input (e.g., four 64×64 clips) and feed the one or more processed clips to a second layer (e.g., a convolutional neural network (CNN) layer). The second layer (e.g., the CNN layer) may include one or more filters. For example, the one or more filters (e.g., sixty-four 8×8 filters) may be applied to the subset of the input image via striding, such that the output image is reduced in size by a stride factor (e.g., a stride of 4). Thus, the output of the second layer (e.g., the CNN layer), including sixty-four 15×15 clips, may include one or more feature maps that are fed to a third layer (e.g., a first fully connected layer). In this regard, the third layer (e.g., the first fully connected layer) is configured to reshape and reduce the size of the one or more feature maps. For example, the third layer (e.g., the first fully connected layer) may be configured to reduce the size of the one or more feature maps from sixty-four 15×15 clips to 1350×1. A fourth layer (e.g., a second fully connected layer) may be configured to further reduce the size of the one or more feature maps. For example, the fourth layer (e.g., the second fully connected layer) may be configured to further reduce the size of the one or more feature maps to 192×1.

In a step 310, the one or more encoded images are sorted into a set of clusters via a clustering algorithm. For example, once the autoencoder has learned the mapping of the input data (e.g., the one or more patch clips), the one or more patch clips are mapped and clustered using the clustering algorithm. For instance, a k-means++ clustering algorithm may be configured to sort the one or more encoded images into a set of clusters. In this regard, the k-means++ clustering algorithm may be configured to group the data into K clusters (e.g., the required number of clusters) and return a normalized distance for each data point.

The normalized distance (d) may be the squared distance of each data point to its cluster center multiplied by a normalized factor, as shown by Eqn 4:

$$d_j = \frac{\|x_j - c_i\|_2^2}{r}$$

where $x_i \in S_i$

The normalization factor (r) is the sum of all the squared residual distances of the data point to its associated class center, as shown by Eqn. 5:

$$r = \sum_i \sum_{x \in S_i} \|x - c_i\|_2^2$$

In Eqns. 4-5, $S_i$ includes all data assigned to cluster i and $c_i$ is the center of cluster i. In Eqn. 4, $x_j$ refers to the jth image, $c_i$ refers to the image calculated by averaging over all the images belonging to the jth cluster, and $\|x_j - c_i\|_2^2$ refers to the squared error between the jth image and the jth cluster center. In Eqn. 5, the normalization factor is calculated by summing over all the squared errors of images (e.g., $\|x - c_i\|_2^2$) to their respective cluster centers. By applying such a normalization factor the average normalized distance metric is 1.

As previously discussed herein, the k-means++algorithm may begin by selecting at random a data point as the centroid for the first cluster. Further, the algorithm may proceed to select remaining centroids one by one probabilistically. It is noted herein the chances of a data point being chosen as a centroid is proportional to the data point's distance from the closest available centroid. In this regard, the algorithm ensures that centroids are spread out on the input space. It is noted that in the conventional k-means algorithm the initial centroid selection is arbitrarily chosen, rather than the specified steps described above.

The distance metric described previously (e.g., Eqn. 4) is configured to highlight outliers in each cluster. For example, the outlier events may be identified using the clustering algorithm, then such outlier events may be presented to the user to attain labels. Further, the outlier clusters may be presented to the user to attain additional labels. In this regard, the distance metric may be defined such that typical values are 1. Images that are sufficiently different than the others may stand out and will take on a larger value than 1, such that a user can easily identify them by sorting the distance metric in ascending order.

In a step 312, the one or more sorted images from the one or more set of clusters are displayed to a user via a user interface 110. For example, a display of the user interface 110 may display the one or more sorted images to the user. For instance, the output of the clustering algorithm may determine which images are presented to the user. In this regard, the relevant highlighted examples are presented to the user to attain labels.

In a step 314, the one or more displayed sorted images receive one or more labels from the user via the user interface 110. For example, the user may use a user input device of the user interface 110 to label the one or more displayed sorted images.

In a step 316, a user determines whether the received one or more labels are sufficient to train a deep learning classifier. For example, the display of the user interface may include one or more diagnostics based on the one or more received labels from the user. For instance, the display may include the number of displayed images the user has labeled. In this regard, a user may determine whether the received one or more labels are sufficient to train the deep learning classifier (e.g., whether the user has labeled a sufficient number of examples across a number of classes). As previously noted herein, the deep learning classifier requires a sufficient number of examples in order to effectively train the deep learning classifier. Thus, a user must determine whether they have sufficiently labeled a satisfactory number of examples to train the deep learning classifier.

Upon determining the received one or more labels are sufficient to train the deep learning classifier, in a step 318, the deep learning classifier is trained using the one or more displayed sorted images and the received one or more labels. Once trained, the deep learning classifier may be applied to one or more additional target images to automatically classify the one or more additional target images.

Figure 4A:
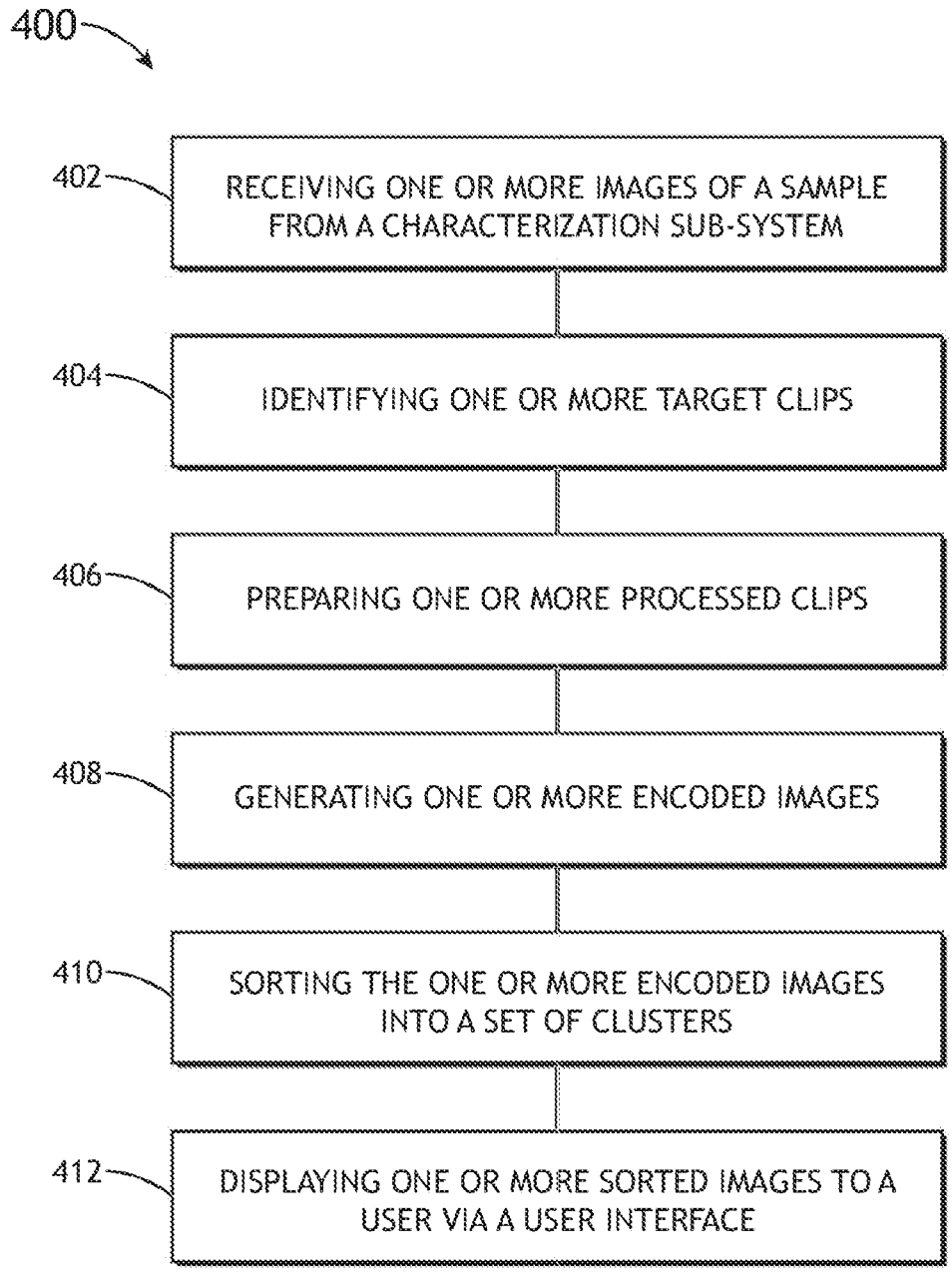
FIG. 4A illustrates a flowchart of a portion of a method for characterizing a sample, in accordance with one or more embodiments of the present disclosure.
Figure 4B:
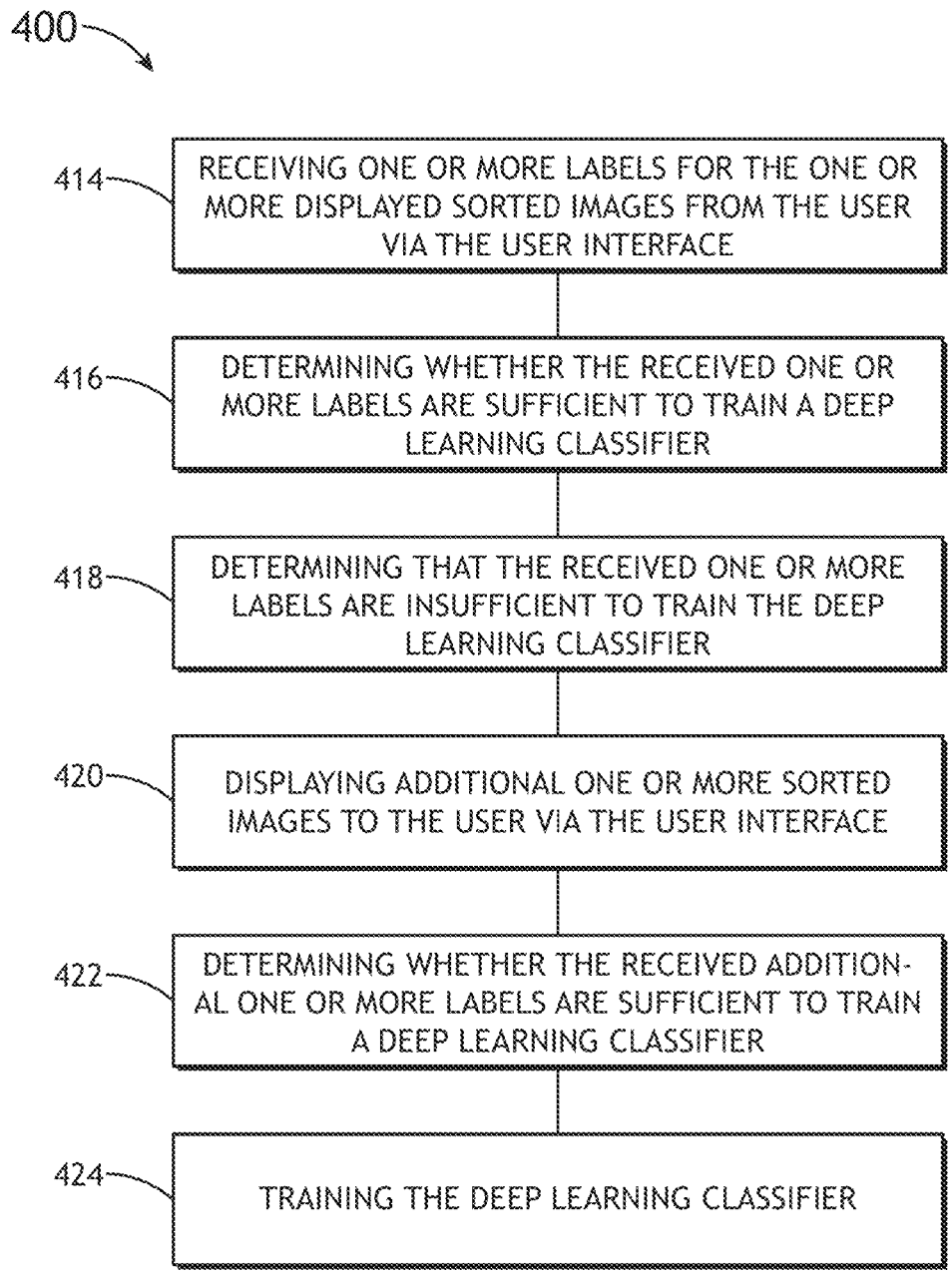
FIG. 4B illustrates a flowchart of a portion of a method for characterizing a sample, in accordance with one or more embodiments of the present disclosure.

FIGS. 4A-4B illustrate a flowchart of a method 400 for using guided discovery to detect defects, in accordance with one or more embodiments of the present disclosure. It is noted herein that the steps of method 400 may be implemented all or in part by system 100. It is further recognized, however, that the method 400 is not limited to the system 100 in that additional or alternative system-level embodiments may carry out all or part of the steps of method 400.

In a step a 402, one or more images 125 of a sample 120 are received from a characterization sub-system 102. For example, as shown in FIG. 1B, the controller 104 may be configured to receive one or more optical images 125 from the optical inspection sub-system 102a. By way of another example, as shown in FIG. 1C, the controller 104 may be configured to receive one or more SEM images 125 from the SEM inspection sub-system 102b.

In a step 404, one or more target clips are identified from the one or more patch clips 135. The one or more images of the sample 120 may include the one or more patch clips 135.

In a step 406, one or more processed clips are prepared from the one or more target clips. For example, one or more median clips may be generated based on the one or more target clips and one or more reference clips. For instance, the one or more median clips may be generated based on a first target clip, a first reference clip, and a second reference clip. By way of another example, one or more difference clips may be generated based on the one or more target clips and the one or more median clips. For instance, the one or more difference clips may be generated by subtracting the median clip from the target clip.

In a step 408, one or more encoded images are generated from the one or more processed clips. For example, an autoencoder may be configured to learn an effective low dimensional representation of the input data (e.g., the one or more patch clips) using a stacked autoencoder (e.g., a single three layered autoencoder).

In a step 410, the one or more encoded images are sorted into a set of clusters. For example, once the autoencoder has learned the mapping of the input data (e.g., the one or more patch clips), the one or more patch clips are mapped and clustered using a clustering algorithm (e.g., k-means++).

In a step 412, the one or more sorted images are displayed to a user via a user interface. For example, a display of the user interface 110 may display the one or more sorted images to the user.

In a step 414, one or more labels for the one or more displayed sorted images are received from the user via the user interface. For example, the user may use a user input device to label the one or more displayed sorted images.

In a step 416, a user determines whether the received one or more labels are sufficient to train a deep learning classifier. For example, a user determines whether there is a sufficient number of examples for all types of objects to be identified.

In a step 418, a user determines that the received one or more labels are insufficient to train the deep learning classifier. For example, the user may determine that there are an insufficient number of examples to train the deep learning classifier.

In a step 420, one or more additional sorted images are displayed to the user via the user interface. For example, the system 100 may be configured to recommend additional examples (e.g., previously sorted images) to attain labels (as shown in step 214 of FIG. 2A). For instance, the user may prompt the system 100 to find additional category B defect examples to attain labels. It is noted herein that the one or more additional sorted images may include images which have gone through at least steps 402-410, but have not yet been through steps 412-414.

In a step 422, additional one or more labels are received from the user via the user interface 110. For example, the recommended examples may be displayed to the user and the user may label the displayed images.

In a step 424, a user further determines whether the received additional one or more labels in conjunction with the one or more labels are sufficient to train the deep learning classifier.

Upon determining that the received one or more additional labels in conjunction with the one or more labels are sufficient to train the deep learning classifier, in a step 426, the deep learning classifier is trained. Once trained, the deep learning classifier may be applied to one or more additional target images to automatically classify the one or more additional target images.

Figure 5:
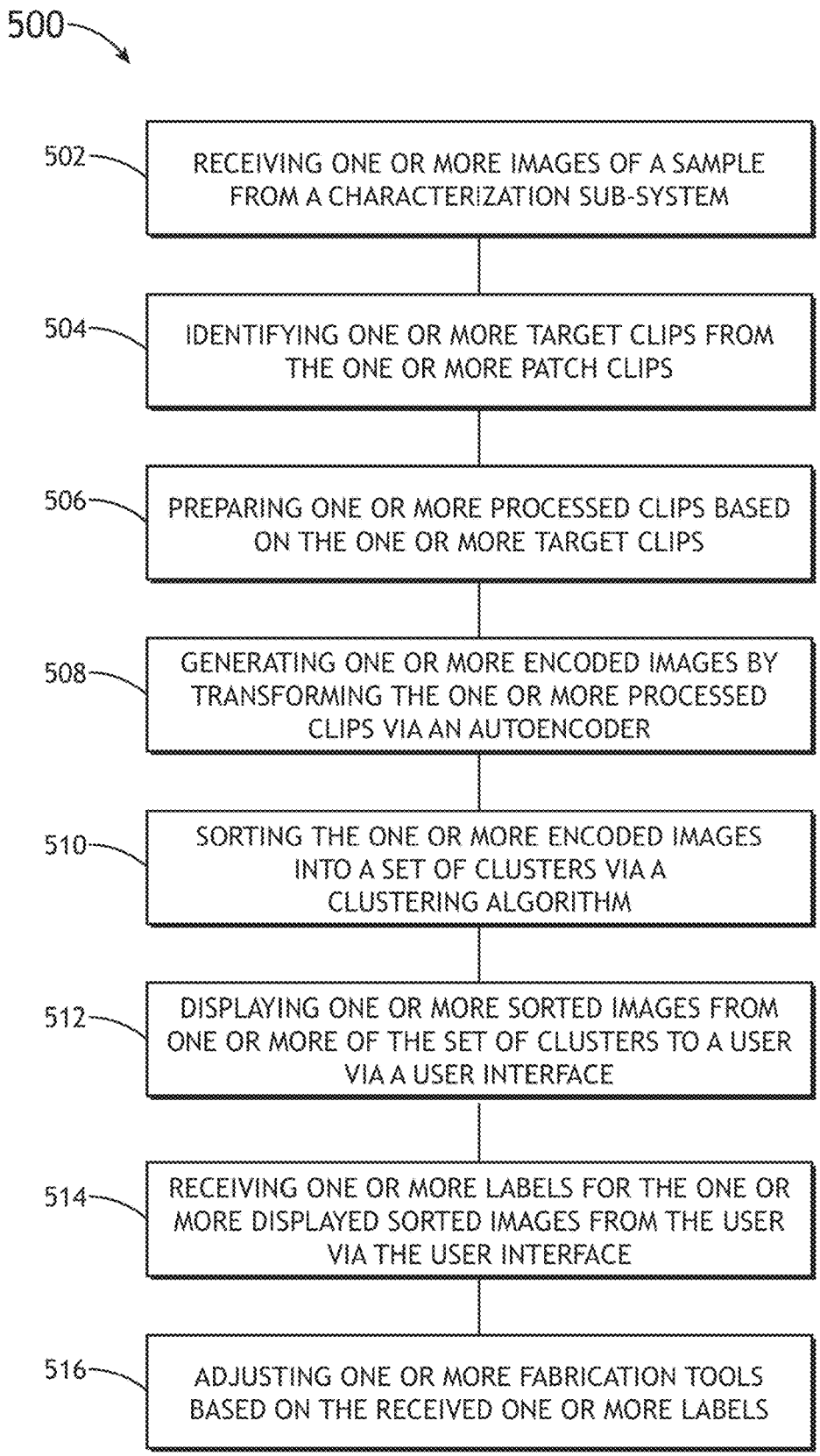
FIG. 5 illustrates a flowchart of a method for characterizing a sample, in accordance with one or more embodiments of the present disclosure.

FIG. 5 illustrates a flowchart of a method 500 for using guided discovery to classify one or more defects, in accordance with one or more embodiments of the present disclosure. It is noted herein that the steps of method 500 may be implemented all or in part by system 100. It is further recognized, however, that the method 500 is not limited to the system 100 in that additional or alternative system-level embodiments may carry out all or part of the steps of method 500.

In a step a 502, one or more images 125 of a sample 120 are received from a characterization sub-system 102. For example, as shown in FIG. 1B, the controller 104 may be configured to receive one or more optical images 125 from the optical inspection sub-system 102a. By way of another example, as shown in FIG. 1C, the controller 104 may be configured to receive one or more SEM images 125 from the SEM inspection sub-system 102b.

In a step 504, one or more target clips are identified from the one or more patch clips 135. The one or more images of the sample 120 may include the one or more patch clips 135.

In a step 506, one or more processed clips are prepared from the one or more target clips. For example, one or more median clips may be generated based on the one or more target clips and one or more reference clips. For instance, the one or more median clips may be generated based on a first target clip, a first reference clip, and a second reference clip. By way of another example, one or more difference clips may be generated based on the one or more target clips and the one or more median clips. For instance, the one or more difference clips may be generated by subtracting the median clip from the target clip.

In a step 508, one or more encoded images are generated from the one or more processed clips. For example, an autoencoder may be configured to learn an effective low dimensional representation of the input data (e.g., the one or more patch clips) using a stacked autoencoder (e.g., a single three layered autoencoder).

In a step 510, the one or more encoded images are sorted into a set of clusters. For example, once the autoencoder has learned the mapping of the input data (e.g., the one or more patch clips), the one or more patch clips are mapped and clustered using a clustering algorithm (e.g., k-means++).

In a step 512, the one or more sorted images are displayed to a user via a user interface. For example, a display of the user interface 110 may display the one or more sorted images to the user (e.g., as shown in FIGS. 6A-6C).

In a step 514, one or more labels for the one or more displayed sorted images are received from the user via the user interface. For example, the user may use a user input device to label the one or more displayed sorted images (e.g., as shown in FIGS. 6A-6C).

In a step 516, one or more fabrications tool are adjusted based on the received one or more labels. For example, one or more fabrications tools may be adjusted in a feed-forward or a feed-back control loop. The one or more fabrication tools may include any fabrication tool known in the art including, but not limited to, a lithography tool, an etching tool, a deposition tool, a polishing tool, and the like.

Figure 6A:
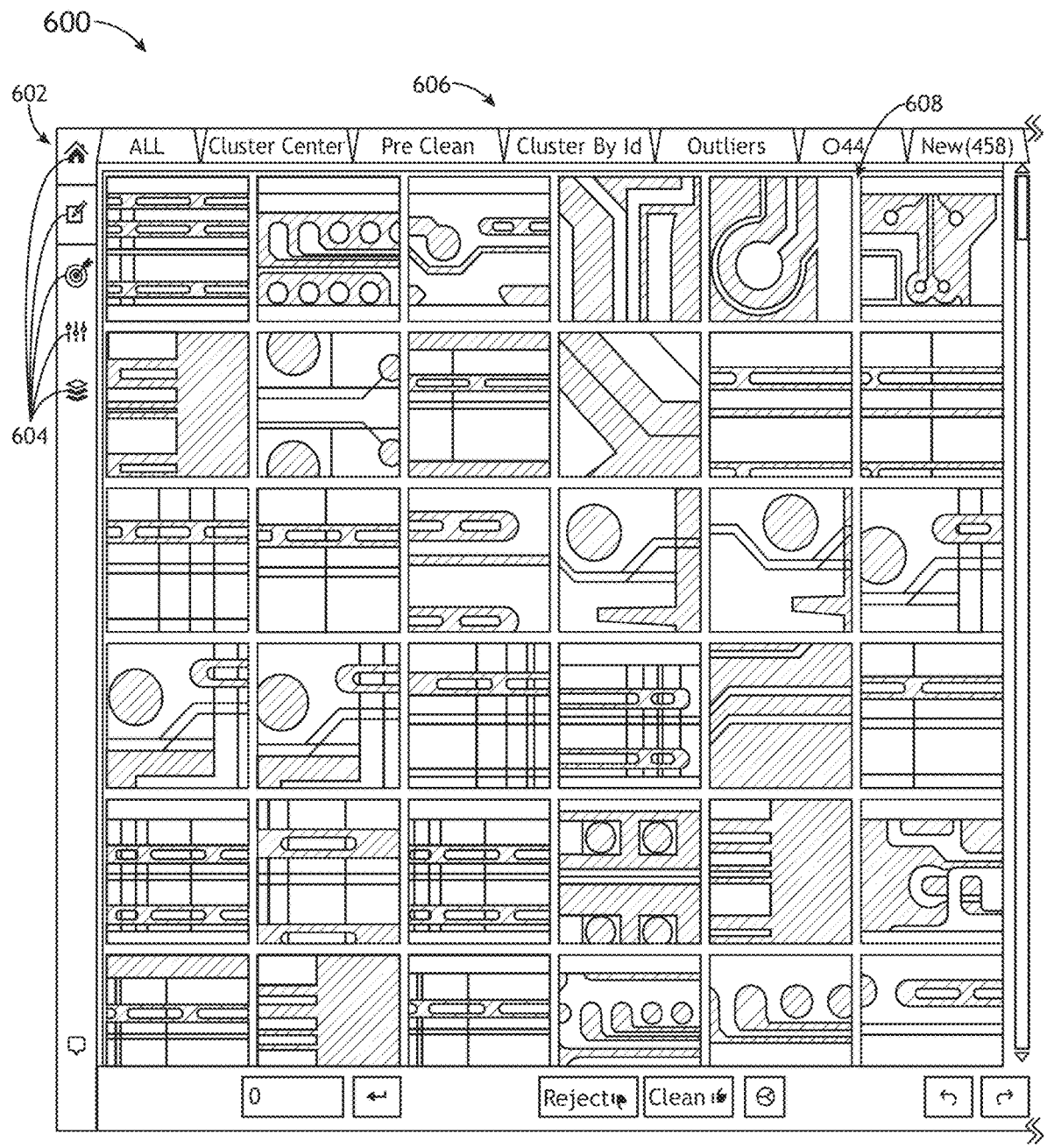
FIG. 6A illustrates a portion of a graphic user interface (GUI), in accordance with one or more embodiments of the present disclosure.
Figure 6B:
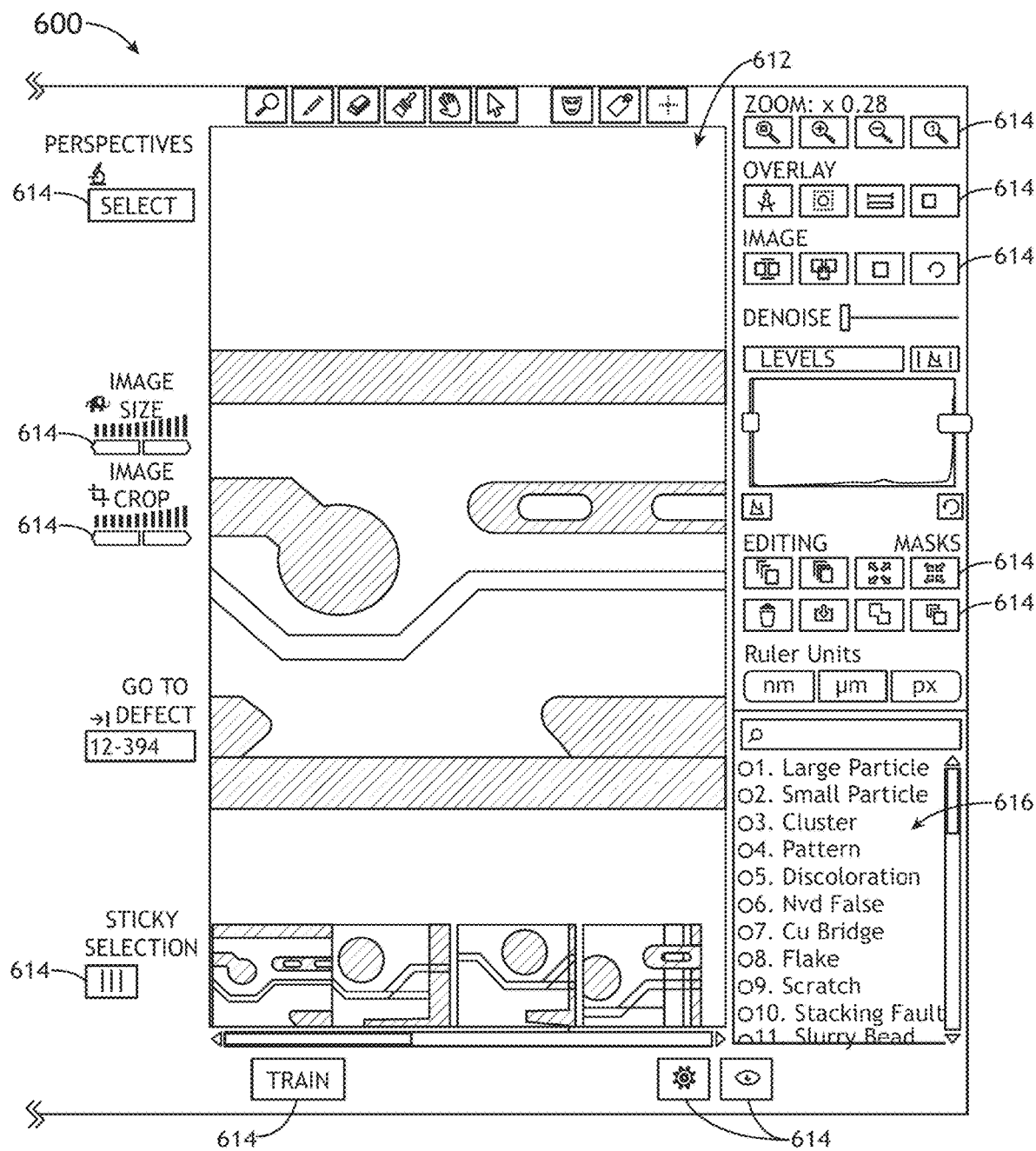
FIG. 6B illustrates a portion of a graphic user interface (GUI), in accordance with one or more embodiments of the present disclosure.
Figure 6C:
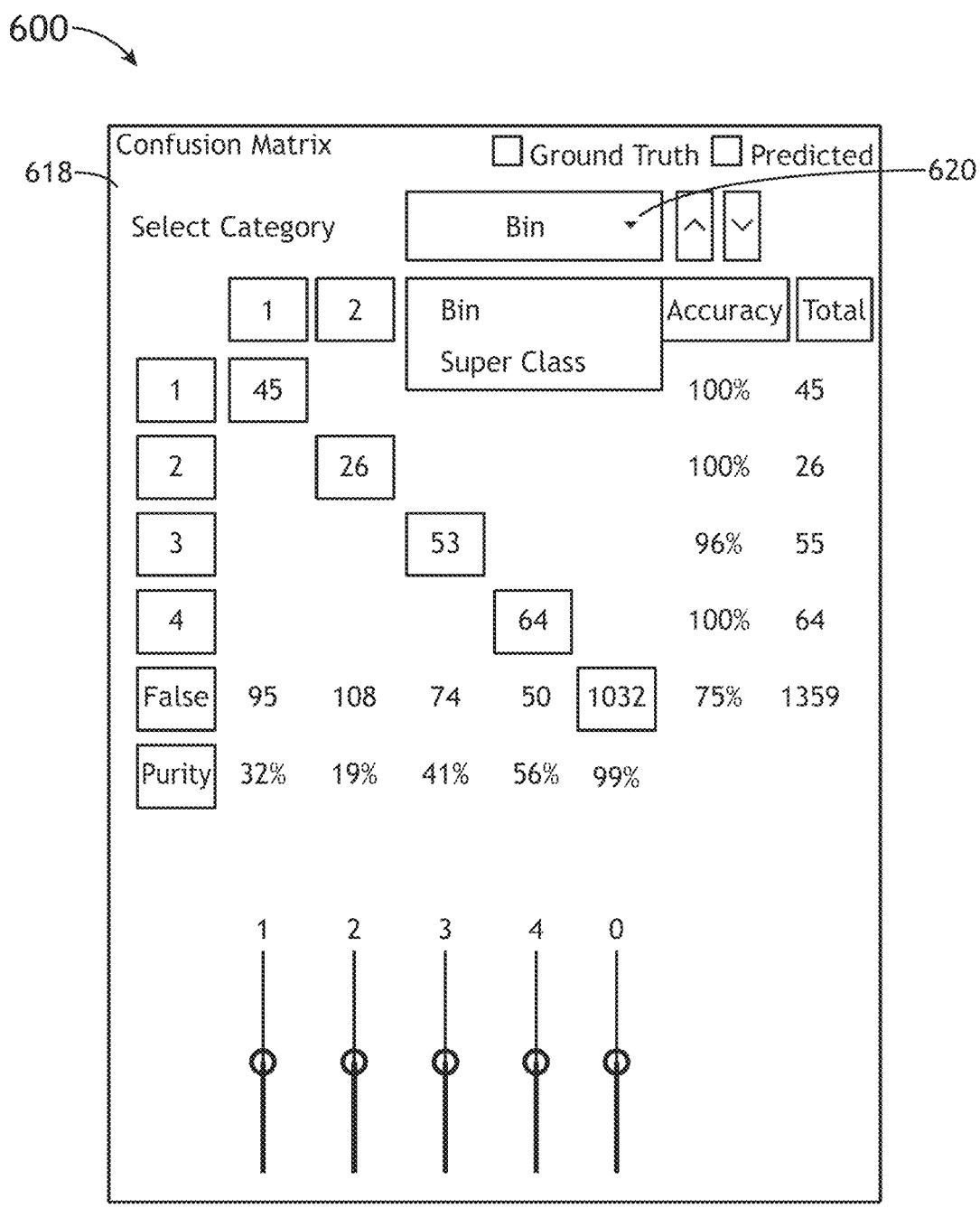
FIG. 6C illustrates a portion of a graphic user interface (GUI), in accordance with one or more embodiments of the present disclosure.

FIG. 6A illustrates a simplified view of a portion of a defect classification graphic user interface (GUI) 600, in accordance with one or more embodiments of the present disclosure. In one embodiment, the GUI 600 is configured to be displayed on a display device. In another embodiment, the GUI 600 is configured to allow for an easy selection of multiple images in a gallery that can be labeled by a user via one or more user input devices (e.g., shortcuts, mouse clicks, or the like). In this regard, the defect classification GUI 600 may be configured to speed up the process of defect classification of large data sets.

In another embodiment, the defect classification GUI 600 includes one or more menu bars 602 including one or more menu icons 604. It is noted herein that although FIG. 6A depicts the one or more menu icons 604 including a home icon, an editing icon, a settings (or parameters) icon, a layer icon, a target icon, or the like, such depiction is provided merely for illustrative purposes and should not be construed as limiting the scope of the present disclosure.

In another embodiment, the GUI 600 includes a reject button. For example, a user may indicate that they wish to remove a record from a training set by selecting the reject button. It is noted herein that this may be desired for a variety of reasons including, but not limited to, the record is ambiguous, the record is not important, or the like.

In another embodiment, the GUI 600 includes one or more window tabs 606. It is noted herein that although FIG. 6A depicts the one or more window tabs 606 including an all tab, a cluster center tab, a pre-clean tab, a cluster by ID tab, an outliers tab, a new tab, and the like, such depiction is provided merely for illustrative purposes and should not be construed as limiting the scope of the present disclosure.

In another embodiment, the GUI 600 includes a display area 608. For example, the GUI 600 may include a display area 608 including one or more review images. By way of another example, the GUI 600 may include a display area 608 including one or more patch clip images 135.

In another embodiment, the selection of the one or more window tabs 606 is configured to change the display area 608. For example, the selection of the one or more window tabs 606 may be configured to change the one or more patch clip images 135 shown on the display area 608. For instance, the selection of the outliers window tab may be configured to show only outlier patch clip images on the display area 608.

In another embodiment, the selection of the one or more menu icons 604 is configured to change one or more components of the GUI 600. For example, the selection of the one or more menu icons 604 may be configured to change one or more components of the display area 608. For example, the selection of the one or more menu icons 604 may adjust various settings controlling the images displayed on the display area 608. For instance, the size of the images may be adjusted via the one or more menu icons 604. In another instance, the number of images displayed may be adjusted. In this regard, the number of images displayed in the space to the right may be adjusted. In another instance, the brightness and/or contract may be adjusted. In another instance, whether to display information or hide information (e.g., labels) about the image in the same space may be adjusted.

FIG. 6B illustrates a simplified view of a portion of a defect classification graphic user interface (GUI) 600, in accordance with one or more embodiments of the present disclosure.

In another embodiment, the GUI 600 includes an editing display area 612 including a patch clip image of the one or more patch clip images 135 from the display area 608. For example, when selecting the edit icon 604, the editing display area 612 including the selected patch clip image may be displayed on the GUI 600. In another embodiment, the editing display area 612 may include one or more editing icons 614. The one or more editing icons 614 may include any editing icon known in the art including, but not limited to, a zoom out icon, a zoom in icon, a crop icon, a ruler icon, a delete icon, a rotate icon, an image size icon, a sticky selection icon, a settings icon, or the like.

In another embodiment, the editing display area 612 includes a list 616 of one or more labels. For example, the editing display area 612 may include a scroll-down menu including the list 616 of the one or more labels. In another embodiment, the editing display area 612 includes a training icon 614. For example, a user may select one or more labels from the list 616 such that the defects may be sufficiently labeled and when a sufficient number of examples have been met the user may select the training icon 614.

In another embodiment, the editing display area 612 includes a row of images. The row of images may include available images for that record. For example, a user may select one or more available images to display in the editing display area 612.

FIG. 6C illustrates a simplified view of a portion of a defect classification graphic user interface (GUI) 600, in accordance with one or more embodiments of the present disclosure. In particular, FIG. 6C illustrates a confusion matrix window 618 of the defect classification GUI 600.

In one embodiment, the confusion matrix window 618 is configured to allow a user to visualize the performance of the deep learning classifier relative to ground truth. For example, the confusion matrix window 618 may include an accuracy percentage for each label.

In another embodiment, the confusion matrix window 618 includes one or more drop-down menus 620. For example, the confusion matrix window 618 may include a category drop-down menu 620.

Figure 7A:
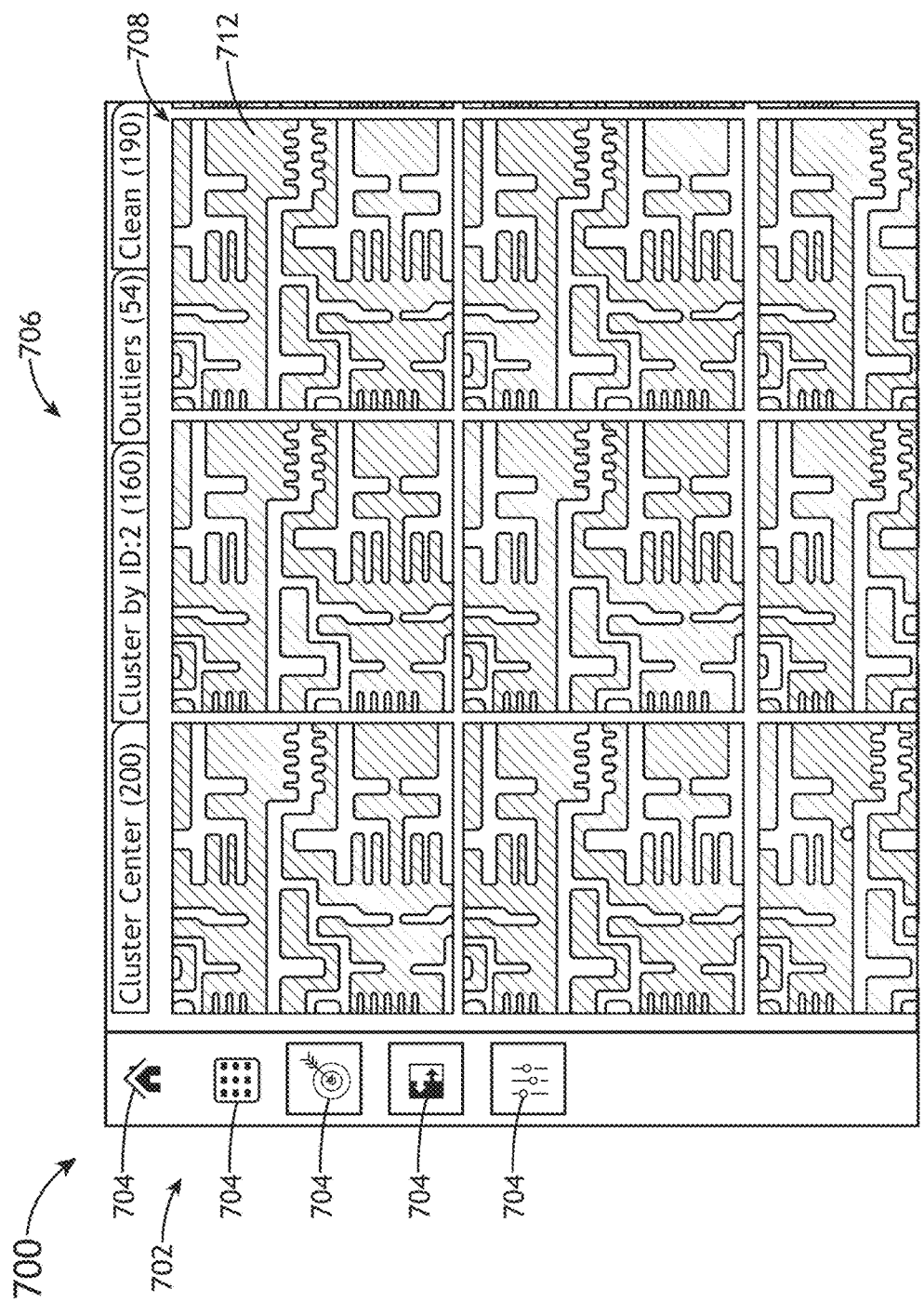
FIG. 7A illustrates a graphic user interface (GUI), in accordance with one or more embodiments of the present disclosure.
Figure 7B:
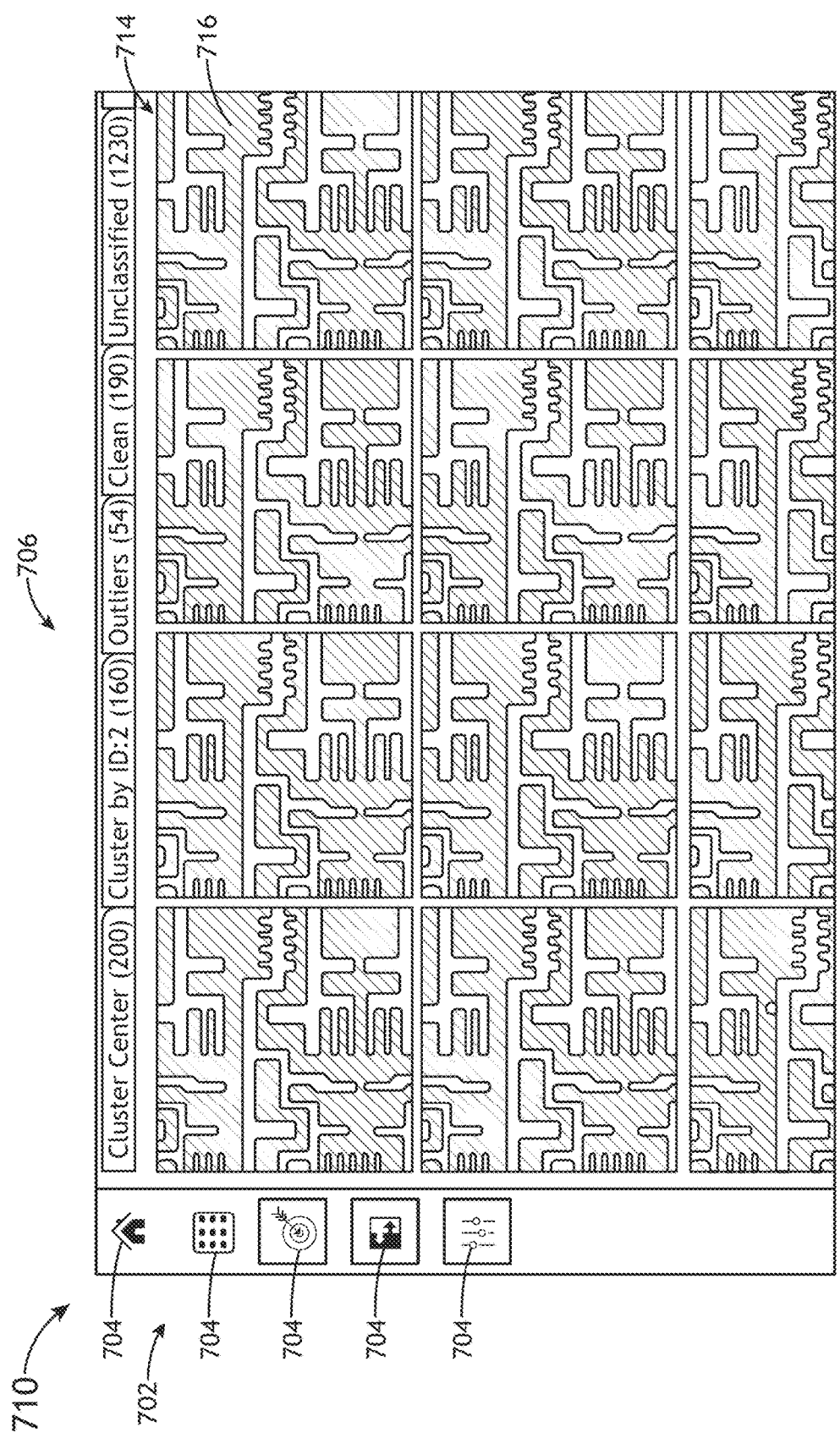
FIG. 7B illustrates a graphic user interface (GUI), in accordance with one or more embodiments of the present disclosure.
Figure 7C:
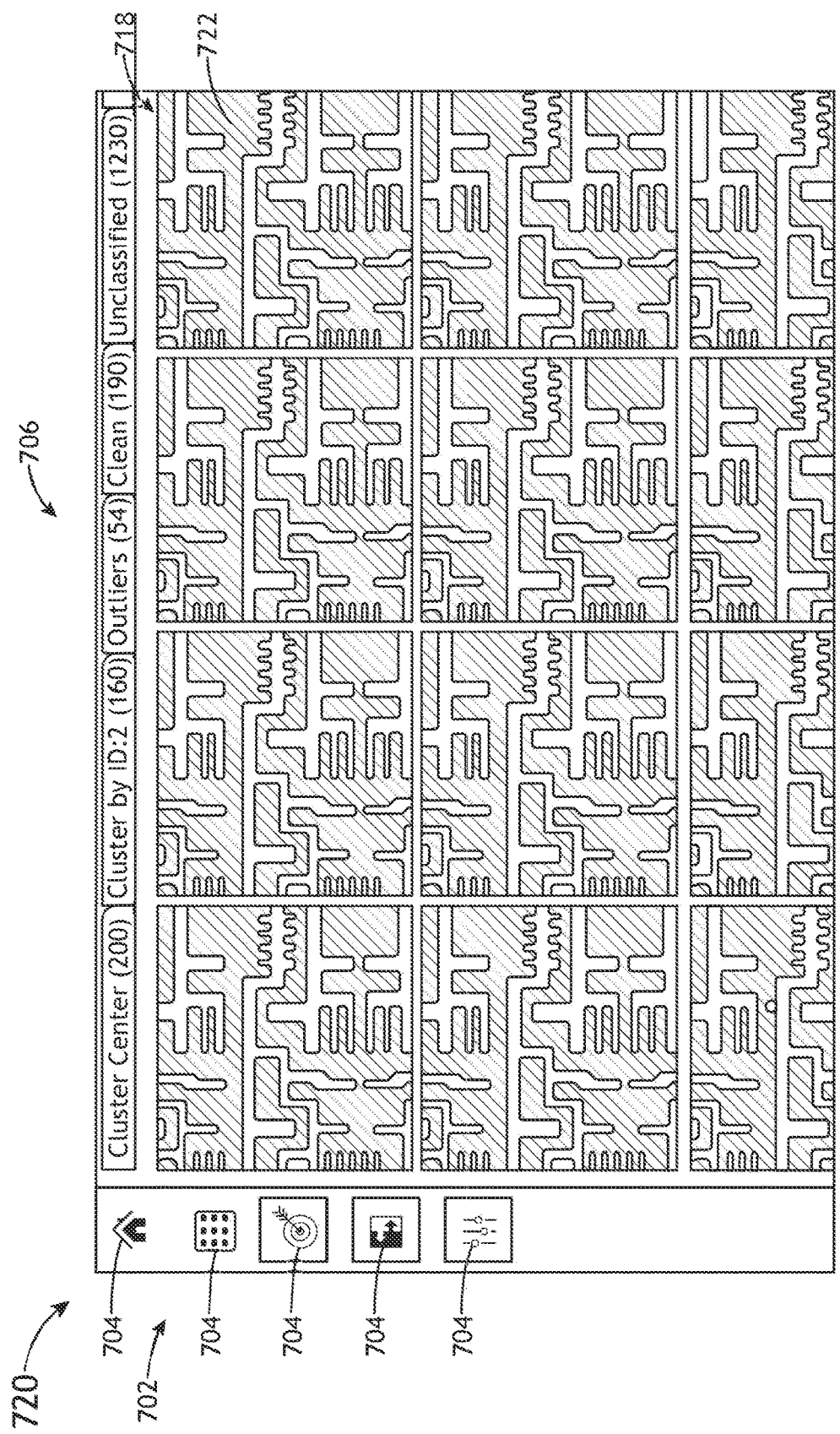
FIG. 7C illustrates a graphic user interface (GUI), in accordance with one or more embodiments of the present disclosure.

FIG. 7A illustrates a simplified view of a cluster centroid GUI 700, in accordance with one or more embodiments of the present disclosure. FIG. 7B illustrates a simplified view of an individual cluster GUI 710, in accordance with one or more embodiments of the present disclosure. FIG. 7C illustrates a simplified view of an outliers GUI 720, in accordance with one or more embodiments of the present disclosure.

Referring generally to FIGS. 7A-7C, in one embodiment, the GUIs 700, 710, 720 are configured to be displayed on a display device. In another embodiment, the GUI 700, 710, 720 includes a menu bar 702 including one or more icons 704. It is noted herein that although FIGS. 7A-7C depict the menu bar 702 including a specific configuration of icons 704 (e.g., a home icon, a target icon, a settings icon, or the like), such depiction is provided merely for illustrative purposes and should not be construed as limiting the scope of the present disclosure. The menu bar 702 may include any number and type of icons 704 suitable for a guided defect discovery GUI.

In another embodiment, the GUI 700, 710, 720 includes one or more window tabs 606. For example, in the cluster centroid GUI 700, the one or more window tabs 706 may include a cluster center tab, a cluster by ID tab, an outliers tab, and a clean tab. By way of another example, in the individual cluster GUI 710, one or more window tabs 706 may include a cluster center tab, a cluster by ID tab, an outliers tab, a clean tab, and an unclassified tab. By way of another example, in the outlier GUI 720, the one or more window tabs 706 may include a cluster center tab, a cluster by ID tab, an outliers tab, a clean tab, and an unclassified tab. It is noted herein that the GUI 700, 710, 720 may include any number and type of window tabs 706 suitable for a guided defect discovery GUI.

Referring to FIG. 7A, in one embodiment, the GUI 700 includes a display area 708. In another embodiment, the display area 708 includes one or more centroid cluster images 712. For example, the display area 708 may include an image of the centroid defect of each cluster (e.g., the one or more centroid cluster images 712). In another embodiment, the GUI 600 is configured to display sorted one or more cluster images 712. For example, the one or more cluster images 712 may be sorted by size. For instance, the one or more cluster images 712 may be sorted by ascending size. It is noted herein that smaller clusters often tend to contain events of interest, therefore it is beneficial to sort cluster size in ascending order. In another instance, the one or more cluster images 712 may be sorted by descending size.

Referring to FIG. 7B, in one embodiment, the GUI 710 includes a display area 714. In another embodiment, the display area 714 includes one or more individual cluster images 716. For example, the display area 714 may include all images belonging to a specific cluster (e.g., the one or more individual cluster images 716).

Referring to FIG. 7C, in one embodiment, the GUI 720 includes a display area 718. In another embodiment, the display area 718 includes one or more outlier images 722. For example, the display area 718 may include a gallery of statistical outliers (e.g., the one or more outlier images 722), as measured according to one or more metrics. In another embodiment, the GUI 720 is configured to display sorted one or more outlier images 722. For example, the one or more outlier images 722 may be sorted according to the metric score. For instance, the one or more outlier images 722 may be sorted by distance to centroid (e.g., distance to cluster center). In another instance, the one or more outlier images 722 may be sorted by a neighborhood distance (e.g., a measure of local density). It is noted herein that outliers are often events of interest, therefore, it is beneficial to sort by metric score (e.g., distance to centroid, neighborhood distance, or the like).

In another embodiment, the GUI 600, 700, 710, 720 is configured to display a predicted completion score. For example, the GUI may be configured to display a predicted completion score based on the user's progress. In this regard, the user's progress may be an estimation of a probability of events of interest still existing in the remaining unlabeled data set. It is noted herein that the clustering data (e.g., distance to centroid) may be used to predict the completion score.

It is noted herein that the deep learning-based technique of system 100 enables a user to quickly review defects based on the highlighted relevant examples of the clustering algorithm. Further, the deep learning-based technique of system 100 enables a user to choose suitable examples to train the deep learning classifier in order to automatically classify additional target images.

It is noted herein that the one or more components of system 100 may be communicatively coupled to the various other components of system 100 in any manner known in the art. For example, the one or more processors 106 may be communicatively coupled to each other and other components via a wireline (e.g., copper wire, fiber optic cable, and the like) or wireless connection (e.g., RF coupling, IR coupling, WiMax, Bluetooth, 3G, 4G, 4G LTE, 5G, and the like). By way of another example, the controller 104 may be communicatively coupled to one or more components of inspection sub-system 102 via any wireline or wireless connection known in the art.

In one embodiment, the one or more processors 106 may include any one or more processing elements known in the art. In this sense, the one or more processors 106 may include any microprocessor-type device configured to execute software algorithms and/or instructions. In one embodiment, the one or more processors 106 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 106. In general, the term "processor" may be broadly defined to encompass any device having one or more processing elements, which execute program instructions from memory 108. Moreover, different subsystems of the system 100 (e.g., illumination source 112, electron beam source 128, detector assembly 126, electron detector assembly 134, controller 104, user interface 110, and the like) may include processor or logic elements suitable for carrying out at least a portion of the steps described throughout the present disclosure. Therefore, the above description should not be interpreted as a limitation on the present disclosure but merely an illustration.

The memory 108 may include any storage medium known in the art suitable for storing program instructions executable by the associated one or more processors 106 and the data received from the inspection sub-system 102. For example, the memory 108 may include a non-transitory memory medium. For instance, the memory 108 may include, but is not limited to, a read-only memory (ROM), a random-access memory (RAM), a magnetic or optical memory device (e.g., disk), a magnetic tape, a solid-state drive and the like. It is further noted that memory 108 may be housed in a common controller housing with the one or more processors 106. In an alternative embodiment, the memory 108 may be located remotely with respect to the physical location of the processors 106, controller 104, and the like. In another embodiment, the memory 108 maintains program instructions for causing the one or more processors 106 to carry out the various steps described through the present disclosure.

In one embodiment, a user interface 110 is communicatively coupled to the controller 104. In one embodiment, the user interface 110 may include, but is not limited to, one or more desktops, tablets, smartphones, smart watches, or the like. In another embodiment, the user interface 110 includes a display used to display data of the system 100 to a user.

The display of the user interface 110 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 110 is suitable for implementation in the present disclosure. In another embodiment, a user may input selections and/or instructions responsive to data displayed to the user via a user input device of the user interface 110.

In one embodiment, the one or more user input devices may include any data input device known in the art. For example, the one or more user input devices may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," "temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
   a controller including one or more processors configured to execute a set of program instructions stored in memory, the set of program instructions configured to cause the one or more processors to:
   receive one or more images of a sample from a characterization sub-system, wherein the one or more images include one or more patch clips;
   identify one or more target clips from the one or more patch clips;
   prepare one or more processed clips based on the one or more target clips;
   generate one or more encoded images by transforming the one or more processed clips via an autoencoder;
   sort the one or more encoded images into a set of clusters via a clustering algorithm;
   display one or more sorted images from one or more of the set of clusters to a user via a user interface;
   receive one or more labels for the one or more displayed sorted images from the user via the user interface;
   determine whether the received one or more labels are sufficient to train a deep learning classifier; and
   upon determining the received one or more labels are sufficient to train the deep learning classifier, train the deep learning classifier via the one or more displayed sorted images and the received one or more labels.

2. The system of claim 1, wherein the preparing the one or more processed clips based on the one or more target clips comprises:
   generating at least one of one or more median clips or one or more difference clips.

3. The system of claim 1, wherein the set of program instructions are further configured to cause the one or more processors to:
   apply the deep learning classifier to one or more additional target images to automatically classify the one or more additional target images.

4. The system of claim 1, wherein the set of program instructions are further configured to cause the one or more processors to:
   prior to determining the received one or more labels are sufficient to train the deep learning classifier, determine that the received one or more labels are insufficient to train the deep learning classifier;
   display additional one or more sorted images to the user via the user interface;
   receive one or more additional labels for the one or more additional displayed sorted images from the user via the user interface; and
   determine whether the received one or more additional labels are sufficient to train the deep learning classifier.

5. The system of claim 1, wherein the characterization sub-system comprises at least one of a scanning electron microscopy (SEM) sub-system or an optical inspection sub-system.

6. The system of claim 5, wherein the optical inspection sub-system comprises at least one of a bright-field inspection sub-system or a dark-field inspection sub-system.

7. The system of claim 1, wherein the autoencoder is configured to learn a low dimensional representation of the one or more patch clips.

8. The system of claim 1, wherein the set of clusters are sorted based on one or more similar defect characteristics.

9. The system of claim 1, wherein the set of clusters further include:
   one or more outlier events.

10. The system of claim 1, wherein the one or more target clips includes one or more defects of interest (DOIs).

11. A system comprising:
    a controller including one or more processors configured to execute a set of program instructions stored in memory, the set of program instructions configured to cause the one or more processors to:
    receive one or more images of a sample from a characterization sub-system, wherein the one or more images include one or more patch clips;

identify one or more target clips from the one or more patch clips;

prepare one or more processed clips based on the one or more target clips;

generate one or more encoded images by transforming the one or more processed clips via an autoencoder;

sort the one or more encoded images into a set of clusters via a clustering algorithm;

display one or more sorted images from one or more of the set of clusters to a user via a user interface;

receive one or more labels for the one or more displayed sorted images from the user via the user interface;

determine whether the received one or more labels are sufficient to train a deep learning classifier;

upon determining the received one or more labels are insufficient to train the deep learning classifier, display additional one or more sorted images to the user via the user interface;

receive one or more additional labels for the one or more additional displayed sorted images from the user via the user interface;

determine whether the received additional one or more labels are sufficient to train the deep learning classifier; and upon determining the received one or more additional labels are sufficient to train the deep learning classifier, train the deep learning classifier via the one of the one or more displayed sorted images, the one or more additional displayed sorted images, the received one or more labels, and the received one or more additional labels.

12. The system of claim 11, wherein the preparing the one or more processed clips based on the one or more target clips comprises:

generating at least one of one or more median clips or one or more difference clips.

13. The system of claim 11, wherein the set of program instructions are further configured to cause the one or more processors to:

apply the deep learning classifier to one or more additional target images to automatically classify the one or more additional target images.

14. The system of claim 11, wherein the characterization sub-system comprises at least one of a scanning electron microscopy (SEM) sub-system or an optical inspection sub-system.

15. The system of claim 14, wherein the optical inspection sub-system comprises at least one of a bright-field inspection sub-system or a dark-field inspection sub-system.

16. The system of claim 11, wherein the autoencoder is configured to learn a low dimensional representation of the one or more patch clips.

17. The system of claim 11, wherein the set of clusters are sorted based on one or more similar defect characteristics.

18. The system of claim 11, wherein the set of clusters further include:

one or more outlier events.

19. The system of claim 11, wherein the one or more target clips includes one or more defects of interest (DOIs).

20. A method comprising:

receiving one or more images of a sample from a characterization sub-system, wherein the one or more images include one or more patch clips;

identifying one or more target clips from the one or more patch clips;

preparing one or more processed clips based on the one or more target clips;

generating one or more encoded images by transforming the one or more processed clips via an autoencoder;

sorting the one or more encoded images into a set of clusters via a clustering algorithm;

displaying one or more sorted images from one or more of the set of clusters to a user via a user interface;

receiving one or more labels for the one or more displayed sorted images from the user via the user interface;

determining whether the received one or more labels are sufficient to train a deep learning classifier; and upon determining the received one or more labels are sufficient to train the deep learning classifier, training the deep learning classifier via the one or more displayed sorted images and the received one or more labels.

21. A method comprising:

receiving one or more images of a sample from a characterization sub-system, wherein the one or more images include one or more patch clips;

identifying one or more target clips from the one or more patch clips;

preparing one or more processed clips based on the one or more target clips;

generating one or more encoded images by transforming the one or more processed clips via an autoencoder;

sorting the one or more encoded images into a set of clusters via a clustering algorithm;

displaying one or more sorted images from one or more of the set of clusters to a user via a user interface;

receiving one or more labels for the one or more displayed sorted images from the user via the user interface;

determining whether the received one or more labels are sufficient to train a deep learning classifier;

upon determining the received one or more labels are insufficient to train the deep learning classifier, displaying one or more additional sorted images to the user via the user interface;

receiving one or more additional labels for the one or more additional displayed sorted images from the user via the user interface;

determining whether the received one or more additional labels are sufficient to train the deep learning classifier; and upon determining the received one or more additional labels are sufficient to train the deep learning classifier, training the deep learning classifier via the one or more displayed sorted images, the one or more additional displayed sorted images, the received one or more labels, and the received one or more additional labels.

* * * * *